US012659630B2

(12) United States Patent  (10) Patent No.: US 12,659,630 B2
Jaiswal et al.  (45) Date of Patent: Jun. 16, 2026

(54) EMBEDDED ROM-BASED MULTI-BIT, MULTI-KERNEL, MULTI-CHANNEL WEIGHTS IN INDIVIDUAL PIXELS FOR IN-PIXEL COMPUTING

(71) Applicant: UNIVERSITY OF SOUTHERN CALIFORNIA, Los Angeles, CA (US)

(72) Inventors: Akhilesh Jaiswal, Los Angeles, CA (US); Ajey P. Jacob, Los Angeles, CA (US); Zihan Yin, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 14 days.

(21) Appl. No.: 18/784,578

(22) Filed: Jul. 25, 2024

(65) Prior Publication Data

US 2024/0381006 A1     Nov. 14, 2024

Related U.S. Application Data

(63) Continuation of application No. PCT/US2023/011531, filed on Jan. 25, 2023.

(60) Provisional application No. 63/302,849, filed on Jan. 25, 2022.

(51) Int. Cl.
*H04N 25/78* (2023.01)
*H04N 25/771* (2023.01)

(52) U.S. Cl.
CPC ........... *H04N 25/78* (2023.01); *H04N 25/771* (2023.01)

(58) Field of Classification Search
None
See application file for complete search history.

(56) References Cited

U.S. PATENT DOCUMENTS

| | | | |
|---|---|---|---|
| 11,069,402 B1 | 7/2021 | Jaiswal et al. | |
| 2012/0038604 A1 | 2/2012 | Liu et al. | |
| 2015/0162368 A1 | 6/2015 | Egawa | |
| 2015/0311929 A1* | 10/2015 | Carbone | H04B 1/123 455/78 |
| 2016/0358967 A1* | 12/2016 | Madurawe | H10F 39/199 |
| 2017/0140807 A1 | 5/2017 | Sun et al. | |
| 2019/0296087 A1 | 9/2019 | Keel et al. | |
| 2021/0051287 A1* | 2/2021 | Panicacci | H04N 25/443 |

(Continued)

OTHER PUBLICATIONS

Patent Cooperation Treaty, International Preliminary Report on Patentability issued in PCT/US2023/011531, Jul. 30, 2024, pp. 1-8.

(Continued)

*Primary Examiner* — Mark T Monk
(74) *Attorney, Agent, or Firm* — Pillsbury Winthrop Shaw Pittman, LLP

(57) ABSTRACT

Provided is an integrated circuit comprising: an amplifier; a sensor electrically connected to a first input of the amplifier; and a set of weights electrically connected to a second input of the amplifier, wherein the amplifier is configured weight an output of the sensor according to an output of the set of weights. Provided is an array of integrated circuits comprising an amplifier; a sensor electrically connected to a first input of the amplifier; and a set of weights electrically connected to a second input of the amplifier, wherein the amplifier is configured weight an output of the sensor according to an output of the set of weights.

23 Claims, 13 Drawing Sheets

(56) References Cited

U.S. PATENT DOCUMENTS

| | | |
|---|---|---|
| 2021/0173894 A1 | 6/2021 | Jaiswal et al. |
| 2021/0264973 A1 | 8/2021 | Jaiswal et al. |
| 2021/0280240 A1 | 9/2021 | Tran et al. |
| 2022/0189514 A1 | 6/2022 | Vimercati et al. |
| 2022/0383912 A1 | 12/2022 | Nagata |

OTHER PUBLICATIONS

Patent Cooperation Treaty, International Search Report issued in PCT/US2023/011531, May 17, 2023, pp. 1-3.
Long et al., "A Ferroelectric FET-Based Processing-in-Memory Architecture for DNN Acceleration", IEEE Journal on Exploratory Solid-State Computational Devices and Circuits, Jun. 19, 2019, pp. 113-122, vol. 5(2).

* cited by examiner

1

EMBEDDED ROM-BASED MULTI-BIT, MULTI-KERNEL, MULTI-CHANNEL WEIGHTS IN INDIVIDUAL PIXELS FOR IN-PIXEL COMPUTING

CROSS-REFERENCE TO RELATED APPLICATIONS

This application claims benefit of U.S. Provisional Patent Application 63/302,849 titled "Embedded ROM-based Multi-Bit, Multi-Kernel, Multi-Channel Weights in Individual Pixels for Enabling In-Pixel Intelligent Computing," filed 25 Jan. 2022 and International Patent Application PCT/US2023/011531 titled "EMBEDDED ROM-BASED MULTI-BIT, MULTI-KERNEL, MULTI-CHANNEL WEIGHTS IN INDIVIDUAL PIXELS FOR IN-PIXEL COMPUTING," filed 25 Jan. 2023. The entire contents of each aforementioned patent filing is hereby incorporated by reference.

GOVERNMENT LICENSE RIGHTS

This invention was made with government support under grant number HR00112190120 awarded by the Defense Advanced Research Projects Agency (DARPA). The government has certain rights in the invention.

BACKGROUND

1. Field

The present disclosure relates generally to the field of complex computing applications and more particularly to pixels with integrated weightings, memory, or logic.

2. Description of the Related Art

Traditionally, pixel (e.g., photodiodes), memory (e.g., static random-access memory (SRAM)/dynamic random-access memory (DRAM)) and computing elements are separate entities in a vision (e.g., image) sensor, which may degrade size, weight, and power (SWaP) and create bandwidth, data processing, and/or switching speed (e.g., as measured by energy-delay product (EDP) or other metric) bottlenecks. As pixels are physically and operationally separate from memory and processing, the data generated by a sensor is transmitted or transferred to a remote computing entity (e.g., processor, chip, computer, server, etc.) for calculations (including dot product calculation, for example), analysis, and decision making. The physical segregation of sensing (at the photodiode or other sensor) from processing (at the computing element) leads to multiple data and data transfer bottlenecks which may limit throughput, increase energy consumption for data transfer, require high amounts of wired or wireless bandwidth and levels of connectivity for continuous or near continuous data transfer, and generate security concerns, and where sensor data may not be encrypted during the transfer, may be otherwise vulnerable during transit, or may be analyzed by or travel through components produced by unknown or untrusted vendors. Artificial intelligence (AI) and/or other data analytics and data science techniques—which are often server (or cloud) centric—may also require preprocessing, computing, packaging, or transmission of sensor data to be performed by computing entities, which may be hampered by separation into disparate elements.

2

SUMMARY

The following is a non-exhaustive listing of some aspects of the present techniques. These and other aspects are described in the following disclosure.

Some aspects include an integrated circuit comprising: an amplifier; a sensor electrically connected to a first input of the amplifier; and a set weights electrically connected to a second input of the amplifier, wherein the amplifier is configured weight an output of the sensor according to an output of the set of weights.

Some aspects include an integrated circuit array comprising: an array of cells, each of the cells comprising an integrated circuit comprising: an amplifier; a sensor electrically connected to a first input of the amplifier; and a set weights electrically connected to a second input of the amplifier, wherein the amplifier is configured weight an output of the sensor according to an output of the set of weights.

Some aspects include a system comprising an integrated circuit array comprising: an array of cells, each of the cells comprising an integrated circuit comprising: an amplifier; a sensor electrically connected to a first input of the amplifier; and a set weights electrically connected to a second input of the amplifier, wherein the amplifier is configured weight an output of the sensor according to an output of the set of weights, one or more processor; and a tangible, non-transitory, machine-readable medium storing instructions that when executed by the one or more processors effectuate operations comprising: selecting one or more weights of the set of weights; providing sensor input to the array; and determining outputs of the cells of the array corresponding to the sensor input based on the selected one or more weights.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
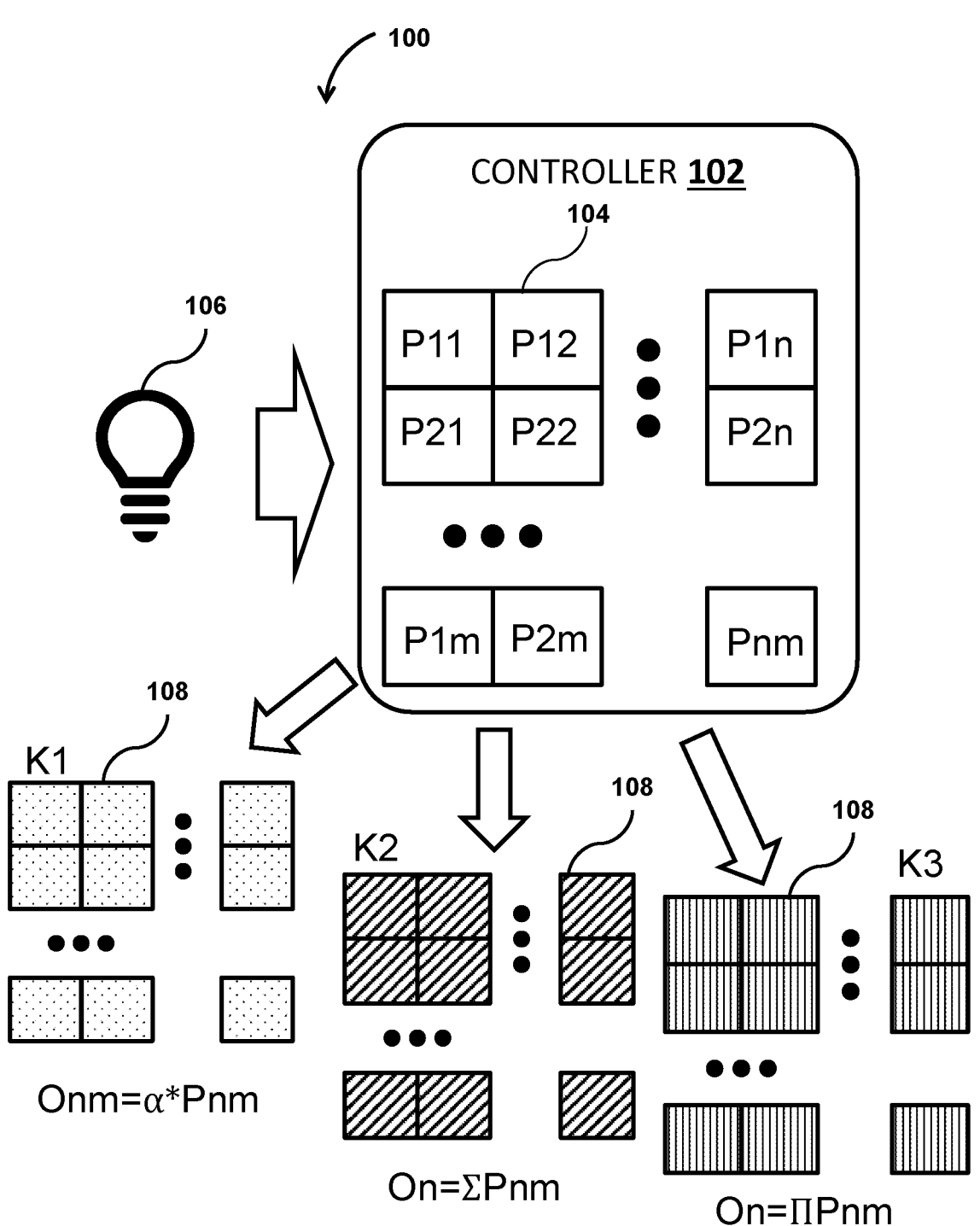
FIG. 1 is a schematic representation of a system for multi-kernel and multi-weight for in-pixel computing, according to some embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the image detection and image processing. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

The description that follows includes example systems, methods, techniques, and operation flows that illustrate aspects of the disclosure. However, the disclosure may be practiced without these specific details. For example, this disclosure refers to specific types of memory (e.g., embedded DRAM (eDRAM), read only memory (ROM), SRAM, DRAM, random-access memory (RAM), MRAM, RRAM, PCRAM, FeRAM, etc.) and specific types of transistors (p-channel metal-oxide-semiconductor (pMOS), complementary metal-oxide-semiconductor (CMOS), etc.) and diodes (PN photodiode, PIN photodiode, etc.) in illustrative examples. Aspects of this disclosure can instead be practiced with other or additional types of memory, transistors, and diodes. Additionally, aspects of this disclosure may be practiced with other types of photosensors or sensors which are not photosensors. Further, well-known structures, components, instruction instances, protocols, and techniques have not been shown in detail to not obfuscate the description.

As discussed above, signals from image sensors, e.g., photodetectors, photosensors, photodiodes, etc., may benefit from processing (e.g., filtering, computation such as dot product determination, etc.) before the data is further processed, transmitted, uploaded to a cloud, feed to a machine learning model, etc. Integration of analog and/or digital computing ability into circuitry within the pixel may allow memory elements, processing elements, and sensors elements to be combined, which may reduce the total number of elements, distance between elements, demands on data transference, and may increase memory, computing power, computational speed, etc. Adding computational elements to each pixel or to groups of pixels may generate parallel computational ability and computational power. Additional circuit elements may be integrated monolithically—on the same chips which contains the pixels, photodiodes, etc.—or heterogeneously using vias or other connection elements and complementary circuit design. Multi-bit, multi-kernel, and multi-channel ROM may be embedded into pixel architecture, as will be further described. Pixel circuitry may be augmented with various types of memory and logical elements, including multiple types of memory and computational elements within a single pixel, photosensor, or sensor or within an array of such elements. Herein, a "pixel" may refer to a multi-color pixel, e.g., a pixel containing one or more detection units with one or more detection wavelength range, or a single color pixel, e.g., one detection unit with one detection wavelength range. A "pixel" may refer to a sub-pixel, or other sub unit of a pixel corresponding to one or more detection units with one or more detection wavelength range. Sensor elements, such as photodiodes, described as corresponding to one pixel may instead correspond to multiple pixels, such as for pixels with overlapping detection areas.

FIG. 1 is a schematic representation of a system 100 for multi-kernel and multi-weight for in-pixel computing. The system 100 contains a controller 102 and a set of pixels 104. The set of pixels 104 may contain pixels arranged along one or two dimensions. The set of pixels 104 are depicted as being arranged in columns 1-*n* and rows 1-*m*. The pixels of the set of pixels 104 are labeled as Pnm based on their location in the array, for case of description. The controller 102 may control or otherwise provide power to the various structures corresponding to the set of pixels 104. The set of pixels 104 may instead be a set of other sensors, individual photosensors, etc. The set of pixels 104 may be exposed to a source, such as light source 106. The set of pixels 104 may produce signals based on exposure to the light source 106. The set of pixels 104 may produce output signals which correspond to one or more kernel 108, where example kernels K1-K3 are depicted. The kernel 108 may operate on output of the set of pixels 104 which has undergone a computational operation, such as weighting, summation, dot product, etc. Weighting may encompass providing a weight to an output. Elements described as weighting one another, such as the set of weighting elements as applied to the output of a photodiode, also describe the inverse weighting relationship, such as the output of a photodiode as applied to a set of weighting elements. Elements described as weighting one another may also be described as gating, activation, allowing reading, etc. of one another. For example, output of the set of weighting elements may be a value stored in memory (e.g., ROM), which may vary by kernel, such as by which kernel is activated. The output of the set of weighting elements may be read or otherwise encoded in output of the pixel when a kernel is activated, and the photodiode of the pixel when a kernel is activated. In some embodiments, the weighting may be a value of the set of weighting elements activated. The weighting may correspond to a weight for a node of a neural network, layer of a neural network, etc. Various arrangement of circuity in pixels with be described hereinafter.

In some embodiments, sensors may be integrated with processing or memory elements. For example, photosensors may be integrated, such as during fabrication, with one or more circuitry elements, such as transistors, diodes, resistive elements, etc. The sensors may be monolithically (e.g., within a single unit) integrated with various elements of circuitry. For example, monolithic integration may be used to position additional processing or memory circuitry within layers (e.g., backside integration) of pixel devices. Monolithic integration may involve CMOS (complementary metal-oxide-semiconductor) image sensors (including visible and near visible light sensors), ultraviolet sensors, infrared sensors, terahertz electromagnetic radiation sensors, etc. These sensors may be integrated with memory—for example embedded dynamic random access memory (eDRAM) and read only memory (ROM)—where the memory may be of the same technology node as the sensor, where the technology node corresponds approximately to a size of the geometry of the transistors (but not necessarily to a specific transistor dimension or critical dimension) which make up the sensor. Light capturing photodiodes or other photodetectors in the sensor and memory elements may be further integrated with logic, which may or may not be of the same technology node as the sensor or memory. The logic may be analog. In some embodiments, the logic may multiply or accumulate signals (or approximate multiplication or summation), such as for neural network computing applications.

In some embodiments, sensors may be heterogeneously integrated with processing or memory elements. For example, sensors, which may include CMOS image sensors (and other visible and near visible light sensors), ultraviolet sensors, infrared sensors, terahertz electromagnetic radiation sensors, etc. as previously described, may be heterogeneously integrated with memory or logic using through silicon vias (TSVs), backside bonding, wafer bonding, packaging, interposers, or other methods. These sensors may be integrated with memory—e.g., eDRAM and ROM—where the memory may be of a different technology node from the sensor. For example, the memory may be of a smaller technology node than the sensor, or of a large technology node than the sensor. The sensor may likewise be integrated with logic, which may be of the same technology node as either the sensor or memory or which may be of another technology node. The logic may be analog. In some embodiments, the logic may multiply or accumulate signals (or approximate multiplication or summation), such as for neural network computing applications.

In some embodiments, neural networks may be mapped onto sensors or an array of sensors. A layer of a neural network may be mapped onto the sensors, such as by configuring parallel computing elements within the sensors or the array of sensors.

In some embodiments, one or more method of analog computing is used to approximate or perform part of a neural network application, such as weighting for a layer of a neural network.

In some embodiments, a pixel circuit contains both a sensor element (e.g., an image sensor) and a memory element (e.g., eDRAM, ROM, etc.). In some embodiments, a pixel circuit contains both a sensor element and multiple types of memory or multiple memory elements (e.g., eDRAM and ROM).

In some embodiments, a sensor or array of sensors may include a multi-functional read circuit or elements thereof for analog computing. In some embodiments, the multi-functional read circuit or elements thereof may also or instead operate based on digital computing.

In some embodiments, circuity may include one or more trans-impedance amplifier (TIA), such as for signal processing. In some embodiment, circuitry may include other or additional amplification elements. In some embodiments, circuitry may function as neurons of a neural network, including using TIAs.

Incorporation of memory or logic within sensor architecture may increase power efficiency, increase performance, and increase density per unit area. Both monolithic and heterogeneous integration of sensors with memory or logic, may be created in pixel computing—including by placing elements in space which may have previously been wasted or empty such as at the edge of a pixel, beneath a pixel, etc. In-pixel circuit elements may enable parallel computing, including massively parallel analog computing, where each sensor pixel and its memory or logic may render processing in parallel. Through architecture design, neural network processing and various computational elements may be mapped onto the sensors themselves, which may improve speed in analysis and decision making. Data density reduction may also be accomplished via in-pixel or on-pixel processing, which may reduce the amount of data requiring transfer to other computation elements without sacrificing accuracy.

Figure 2:
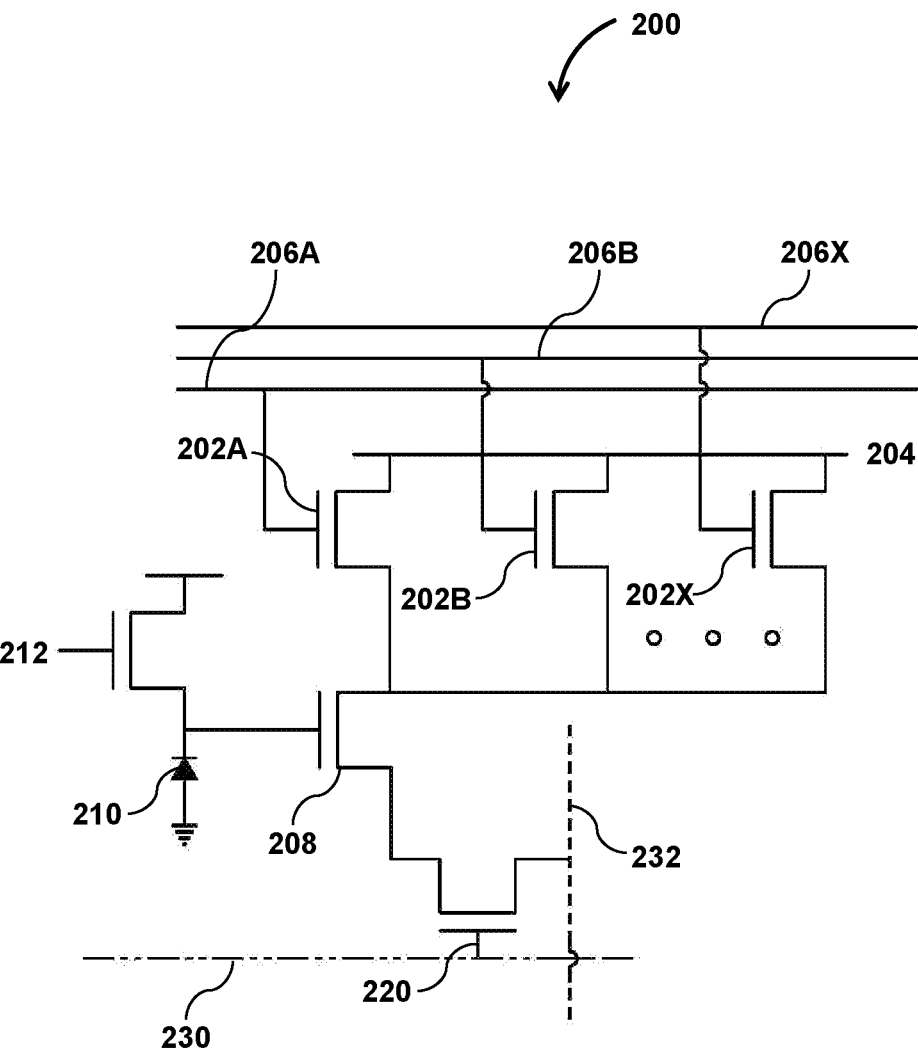
FIG. 2 is an example circuit diagram depicting a multi-bit, multi-kernel read only memory (ROM) embedded pixel with a set of transistor weighting elements; according to some embodiments.

Example embodiments for multi-bit, multi-kernel, and multi-channel ROM embedded pixels are depicted in FIGS. 2-6. FIG. 2 is an example circuit diagram depicting a multi-bit, multi-kernel read only memory (ROM) embedded pixel 200 with a set of transistor weighting elements 202. A weighting element may also be referred to as a "weight". A weight, as that term is used herein, includes the circuit element that stores or otherwise encodes some or all of a weight to be applied, even if that circuit element has not yet had such a weight set, e.g., such a circuit element still constitutes a weight when the entire integrated circuit is turned off. Transistor weighting elements 202A, 202B, and 202X, are depicted, but more or fewer transistor weighting elements 202 may make up a set of weighting elements. Each of the transistor weighting elements 202 may be connected, such as in series or parallel, to a source (or drain) of an amplifying transistor 208. Output of the set of transistor weighting elements 202 functions as input to the amplifying transistor 208, such as via a source, drain, or other input. A photodiode 210, which may be any appropriate photosensor or other sensor, may be connected with a gate of the amplifying transistor 208. The photodiode 210 may receive input from one or more optical sources, including from a pixel (such as of a camera), from an image (such as of a display), etc. The photodiode 210 may have an accumulation area or sensor area and may have an accumulation time or collection time. Output of the photodiode 210 functions as input to the amplifying transistor 208, such as via the gate. The amplifying transistor 208 may be a TIA or other appropriate amplification element. The photodiode 210 may be electrically connected to a reset element 212, which may be a reset transistor. Operation of the reset element 212 may be used, such as after an accumulation time, read operation, etc., to reset the photodiode 210 or the amplifying transistor 208 to a base state.

In some embodiments the photodiode 210 may be operably or electrically coupled to a memory element or logical element before being coupled to the amplifying transistor 208. As an example, the photodiode 210 may be coupled in series with a storage element, where the storage element, which may be a transistor, may store a written value fixed during manufacturing.

In some embodiments, various connections described as made to a source of a transistor may instead by made via a drain of a transistor. Hereinafter, any mention of a transistor source should be understood to be encompass instead a transistor drain and likewise any mention of a transistor drain should be understood to encompass use of a transistor source, as transistors may be symmetric or may be designed with various source-drain properties. The set of transistor weighting elements 202 are in turn each connected to (e.g., controlled by) inputs from one of a set of input lines 206, where each transistor weighting element 202A, 202B, 202X corresponds to a respective input line 206A, 206B, 206X. The input lines 206 may be connected to the gates of the transistor weighting elements 202.

Each of the set of transistor weighting elements 202A may have different physical or electrical characteristics (e.g., dimensions), such as such as W/L (width to length ratio), threshold voltage $V_t$, output characteristics, transfer characteristics, etc. The different physical or electrical characteristics may correspond to different output characteristics, such as drain current, drain voltage, etc., which may be input into and thus weight the output of the amplifying transistor 208.

One or more of the input lines 206 may be activated or charged at a time, which may in turn activate (e.g., gate on) one or more of the transistors weighting elements 202. For example, both a transistor N (with a $W/L_n$) and a transistors M (with a $W/L_m$) may be turned on during a time period, one transistor may be active at a first time, or no transistors may be active at a second time. The transistors weighting elements 202 may be floating gate transistors, fin field-effect transistor (finFET), charge trapped transistor (CTT), or any other geometry or arrangement of transistors. In some embodiments, each of the input lines 206 may correspond to a specific kernel or a specific channel, which may correspond to a specific neural network layer, and which may be activated independently.

The total drain current of the set of transistors weighting elements 202, which may be the source current of the amplifying transistors 208, may be the cumulative drain current of those selected of the set of transistor weighting elements 202 that are activated by the input lines 206 (e.g., input lines 206A-206X). The cumulative drain current may include impedance and load balancing effects from the set of transistor weighting elements 202. The set of transistor weighting elements may have a shared drain voltage, $V_{drain}$, and a shared source voltage, $V_{source}$, such as a shared source voltage provided by a common source input 204. The drain current and drain voltage of the set of transistor weighting elements 202 may be the source current and source voltage of the amplifying transistor 208. For example, one or more of the set of transistor weighting elements may share a drain region or may share a conductive region which is both the drain of at least one of the set of transistor weighting elements 202 and a source region for the amplifying transistor 208. Alternatively, the drains of the set of transistor weighting elements 202 may be electrically connected (e.g., coupled) to the source of the amplifying transistor 208, through electrically conductive elements (e.g., metal lines, highly doped areas), including connected through various levels of a chips or other fabrication unit, such as through TSVs, in-plane lines, etc. The electrical connection between an output or drain of the set of transistor weighting elements 202 and the source of the amplifying transistor 208 may include other electrical elements, including capacitive elements, resistive elements, junctions between materials which may function Schottky junctions, etc.

The output of the set of transistor weighting elements 202 as switched by the amplifying transistor 208 may be read using a word line 230 and bit line 232, including using a select transistor 220. The output of multiple sensors or pixels 200 may be read in a sensor array. Multiple sensors or pixels 200 (or other pixels) may be connected to each of the parallel input lines 206, or to some of a set of input lines 206 such that multi-channel and/or multi-kernel calculations may take place at some or all of the pixels or sensors of the sensor array. The amplifying transistor 208 and the select transistor 220 may enable reading of the pixel 200, including of any ROM (or other memory) stored in the set of transistor weighting elements 202.

In some embodiments, the set of transistor weighting elements 202 may comprise multiple transistors instead of single weighting transistors corresponding to each of the input lines 206. The transistor weighting elements 202 may comprise one or more transistor in series and/or multiple parallel transistors electrically coupled with a single input line 206. For example, instead of varying W/L or another physical or electrical characteristic, each of the set of transistor weighting elements 202 may have the same W/L and each input line 206 may be connected to a varying number of transistors such that when an input line A is activated the output current and voltage is derived from a number A of the set of transistor weighting elements 202 and when in input line B is activated the output current and voltage is derived from a number B of the set of transistor weighting elements 202. Each of the input lines 206 (e.g., the input lines 206A-206X) corresponding to different widths or varying number of transistors may represent individual kernels, such as those corresponding to a given neural network layer. Thus, set of transistor weighting elements 202 may function as multiple kernels for a given neural network and/or a given neural network layer. Transistors with different widths or variations in the number of transistors for each kernel may constitute multi-bit ROM weights for respective kernels of a given neural network layer.

Figure 3:
FIG. 3 is an example circuit diagram depicting a multi-bit, multi-kernel ROM embedded pixel with a set of diode weighting elements; according to some embodiments.
Figure 3:
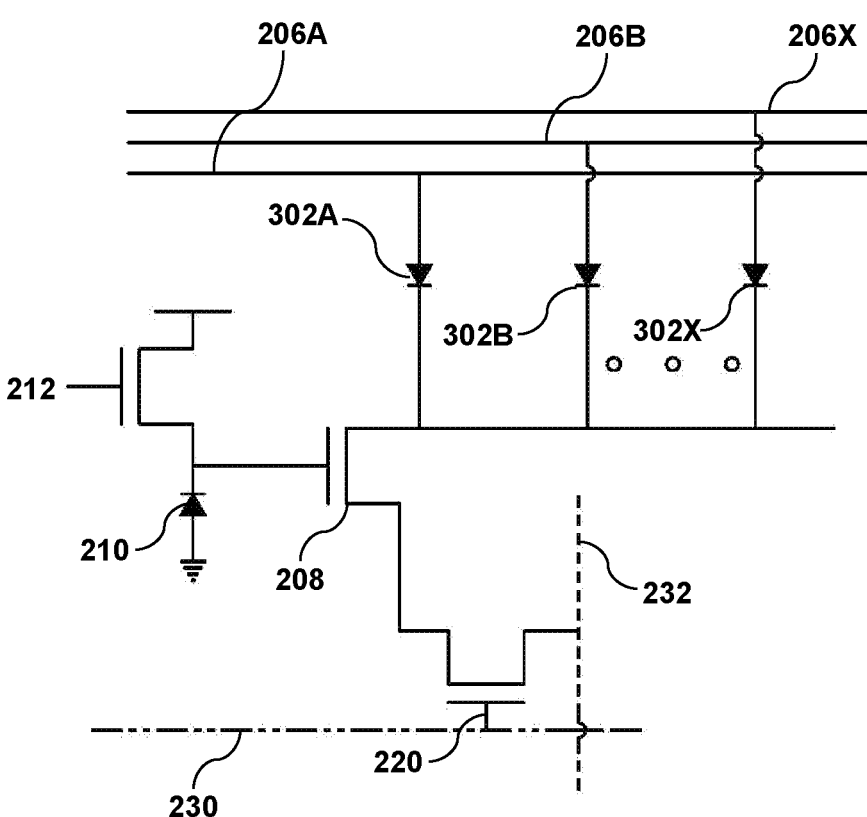

FIG. 3 is an example circuit diagram depicting a multi-bit, multi-kernel ROM embedded pixel 300 with a set of diode weighting elements. The pixel 300 is described with respect to elements similar to those described in reference to FIG. 2, which may be any appropriate elements as previously described. Diode weighting elements 302A, 302B, and 302X, are depicted, but more or fewer diode weighting elements 302 may make up a set of weighting elements. Each of the diode weighting elements 302 may be connected, such as in series or parallel, to a source (or drain) of an amplifying transistor 208, which may be any appropriate amplification element as previously described in reference to FIG. 2. Output of the set of diode weighting elements 302 functions as input to the amplifying transistor 208, such as via a source, drain, or other input. A photodiode 210, which may be any appropriate photosensor or other sensor as previously described in reference to FIG. 2, may be connected with a gate of the amplifying transistor 208.

The set of diode weighting elements 302 may act as a source for the amplifying transistor 208. The diode weighting elements may in turn each be controlled by one of a set of input lines 206 (e.g., by the input lines 206A, 206B, and 206X, respectively). Each of the diode weighting elements 302 may have different physical or electrical characteristics, such as different forward current capacity, threshold voltage, saturation current, etc. One or more of the input lines 206 may be activated or charged at a time, which in turn may activate one or more of the set of diode weighting elements. For example, both a diode N and a diode M may be turned on during a time period, one diode may be active at a first time, or no diodes may be active at a second time. The total output current of the set of diode weighting elements, which may be the source current of the amplifying transistor 208, may be the cumulative output current of those of the set of diode weighting elements 302 that are selected and/or activated by the input lines 206 (e.g., input lines 206A, 206B, and 206X). The cumulative output current may be affected by impedance and load balancing effects. The set of diode weighting elements 302 may have a shared output voltage, $V_{out}$ or $V_{cathode}$, and may not have shared input voltage, $V_{in}$ or $V_{anode}$. The output current and output voltage of the set of diode weighting elements 302 may be the source current and source voltage of the amplifying transistor 208—for example one or more of the set of diode weighting elements 302 may electrically contact a source region for the amplifying transistor 208 through a conductive element, including connected through various levels of a chips or other fabrication unit, such as through TSVs, in-plane lines, etc. The electrical connection between an output of the set of diode weighting elements 302 and the source of the amplifying transistor 208 may include other electrical elements, including capacitive elements, resistive elements, junctions between materials which may function Schottky junctions, etc. Any mention of a diode anode should be understood to also encompass examples in which the diode anode is instead a diode cathode, and any mention of a diode cathode should be understood to encompass examples in which the diode cathode is instead a diode anode, while maintaining appropriate diode characteristics and current flow. That is, current may flow in either direction through a diode if the diode orientation or doping is selected appropriately. In some instances, diodes may be operated in breakdown mode.

The output of the set of diode weighting elements 302 as switched by the amplifying transistor may be read using a word line 230 and bit line 232, including using a select transistor 220. The output of multiple sensors or pixels 300 may be read in a sensor array. Multiple sensors or pixels 300 (or other pixels) may be connected to each of the parallel input lines 206, or to some of a set of input lines 206 such that multi-channel and/or multi-kernel calculations may take place at some or all of the pixels or sensors of the sensor array. The amplifying transistor 208 and the select transistor 220 may enable reading of the pixel 300, including of any ROM (or other memory) stored in the set of diode weighting elements 302.

In some embodiments, the set of diode weighting elements 302 may comprise multiple transistors instead of single weighting diodes corresponding to each of the input lines 206. The diode weighting elements 302 may comprise one or more diode in series and/or multiple parallel diodes electrically coupled with a single input line 202. For example, instead of physical or electrical characteristic of the diode weighting elements 302, each of the set of diode weighting elements 302 may have the same electrical characteristics and each input line 206 may be connected to a varying number of diodes such that when an input line A is activated the output current and voltage is derived from a number A of the set of diode weighting elements 302 and when in input line B is activated the output current and voltage is derived from a number B of the set of diode weighting elements 302. Each of the input lines 206 (e.g., the input lines 206A-206X) corresponding to different forward currents or varying number of diodes may represent individual kernels, such as those corresponding to a given neural network layer. Thus, set of diode weighting elements 302 may function as multiple kernels for a given neural network and/or a given neural network layer. Diodes with electrical characteristics for each kernel may constitute multi-bit ROM weights for respective kernels of a given neural network layer.

Figure 4:
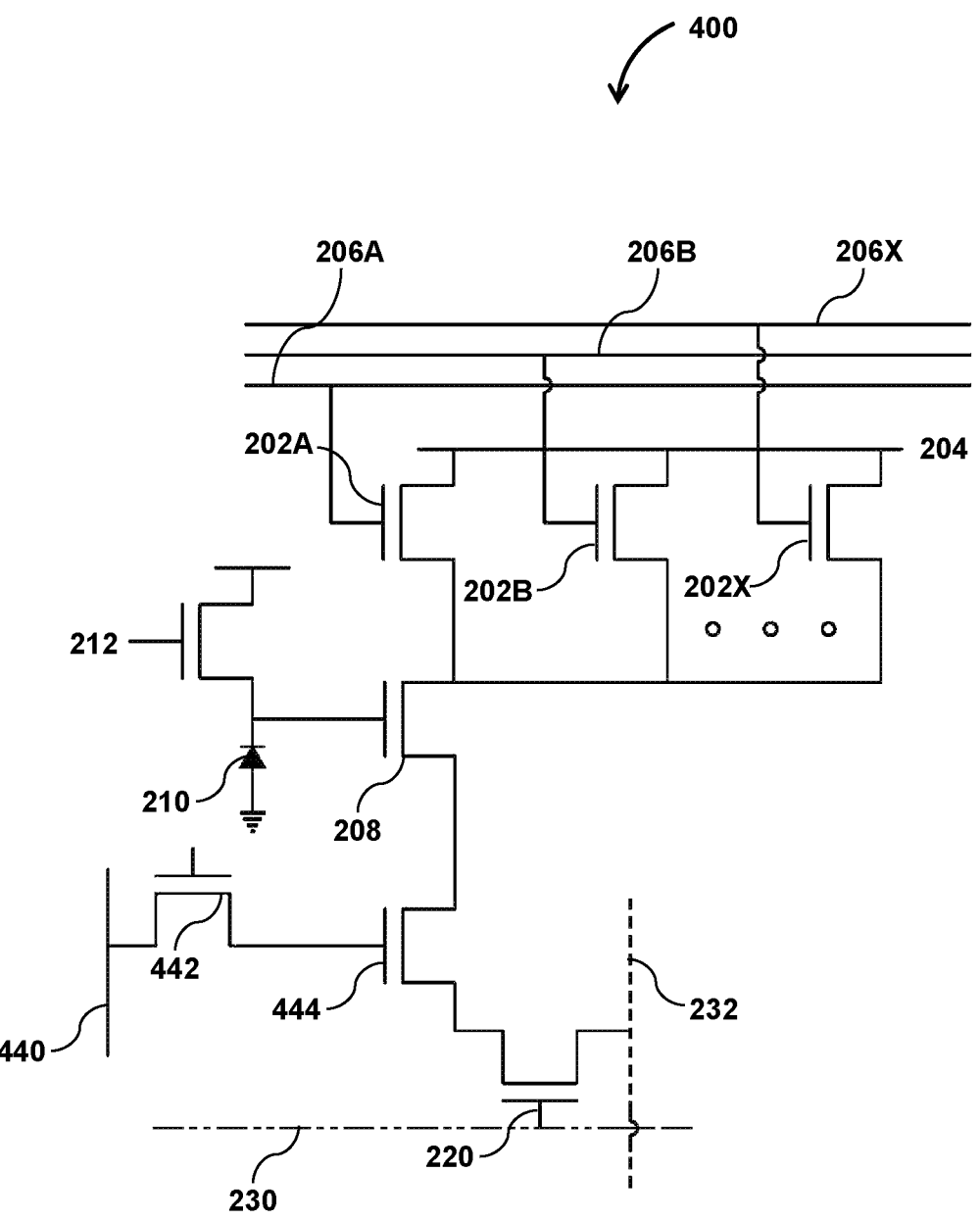
FIG. 4 is an example circuit diagram depicting a multi-bit, multi-kernel ROM embedded pixel with a set of transistor weighting elements and integrated embedded dynamic random access memory (eDRAM), according to some embodiments.

FIG. 4 is an example circuit diagram depicting a multi-bit, multi-kernel ROM embedded pixel 400 with a set of transistor weighting elements and integrated embedded dynamic random access memory (eDRAM). The pixel 400 is described with respect to elements similar to those described in reference to FIG. 2, which may be any appropriate elements as previously described. The pixel 400 contains additional elements, which may constitute elements of readable and writeable memory. A second input 440 provides access to a memory element 442 which may store writable or dynamic memory. The memory element 442 may be a dynamic memory transistor. The memory element 442 may be accessible by multiple inputs, such as the second input 440 which may provide source voltage or other input for reading of the memory element 442. The memory element 442 may also be accessible by a voltage or input for storing data (e.g., bits) in the memory element, or a write element. The memory element 442 may be written by any appropriate method, such as charge injection, floating gate charge injection, etc. The amplifying transistor 208 may be connected in series with a second amplifying transistor 444, the output of which may be the output of the pixel 400.

The memory element 442 may comprise a single transistor, two or more transistors, a transistor and a capacitor, or any combination thereof. The memory element 442 may comprise a reset transistor and/or other means of refreshing memory storage. In some embodiments, the memory element 442 may be coupled to a source of the amplifying transistor 208, while the set of parallel weighting transistors are connected to a gate of the second amplifying transistor 444.

The output of the set of transistor weighting elements as gated by the amplifying transistor 208 (based on the output of the photodiode 210) may be further gated by the memory element 442 and the second amplifying transistor 444. The output of the memory element 442 may be read using a word line 230 and bit line 232, including using a select transistor 220. The output of multiple sensors or pixels 400 may be read in a sensor array. Multiple sensors or pixels 400 (or other pixels) may be connected to each of the parallel input lines 206, or to some of a set of input lines 206 such that multi-channel and/or multi-kernel calculations may take place at some or all of the pixels or sensors of the sensor array. The amplifying transistor 208, the second amplifying transistor 444, and the select transistor 220 may enable reading of the pixel 400, including of any ROM (or other memory) stored in the set of transistor weighting elements 202 and of any eDRAM (or other memory) stored in the memory element 442.

Figure 5:
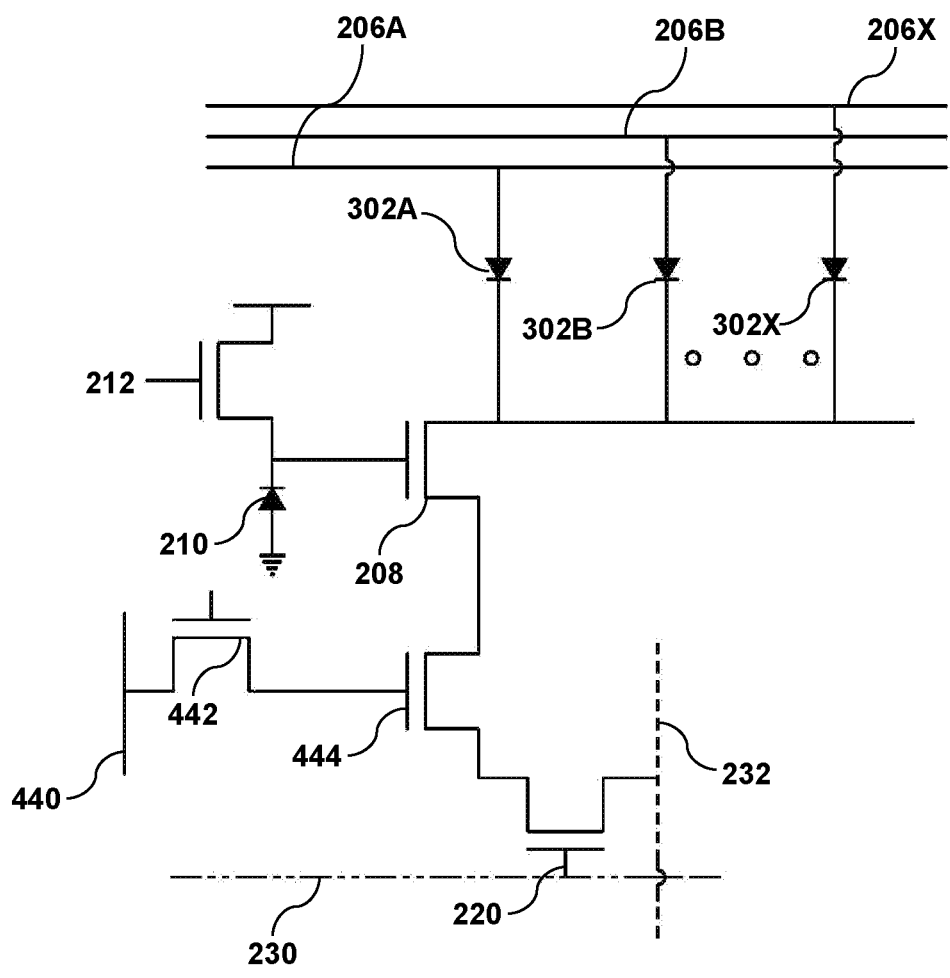
FIG. 5 is an example circuit diagram depicting a multi-bit, multi-kernel ROM embedded pixel with a set of diode weighting elements and integrated eDRAM, according to some embodiments.

FIG. 5 is an example circuit diagram depicting a multi-bit, multi-kernel ROM embedded pixel 500 with a set of diode weighting elements and integrated eDRAM. The pixel 500 is described with respect to elements similar to those described in reference to FIGS. 2, 3, and 4, which may be any appropriate elements as previously described. The pixel 500 contains additional elements, which may constitute elements of readable and writeable memory. A second input 440 provides access to a memory element 442 which may store writable or dynamic memory. The memory element 442 may be a dynamic memory transistor. The memory element 442 may be accessible by multiple inputs, such as the second input 440 which may provide source voltage or other input for reading of the memory element 442. The memory element 442 may also be accessible by a voltage or input for storing data (e.g., bits) in the memory element, or a write element. The memory element 442 may be written by any appropriate method, such as charge injection, floating gate charge injection, etc. The amplifying transistor 208 may be connected in series with a second amplifying transistor 444, the output of which may be the output of the pixel 400. The second The memory element 442 may comprise a single transistor, two or more transistors, a transistor and a capacitor, or any combination thereof. The memory element 442 may comprise a reset transistor and/or other means of refreshing memory storage. In some embodiments, the memory element 442 may be coupled to a source of the amplifying transistor 208, while the set of parallel weighting transistors are connected to a gate of the second amplifying transistor 444.

The output of the set of transistor weighting elements as gated by the amplifying transistor 208 (based on the output of the photodiode 210) may be further gated by the memory element 442 and the second amplifying transistor 444. The output of the memory element 442 may be read using a word line 230 and bit line 232, including using a select transistor 220. The output of multiple sensors or pixels 400 may be read in a sensor array. Multiple sensors or pixels 400 (or other pixels) may be connected to each of the parallel input lines 206, or to some of a set of input lines 206 such that multi-channel and/or multi-kernel calculations may take place at some or all of the pixels or sensors of the sensor array. The amplifying transistor 208, the second amplifying transistor 444, and the select transistor 220 may enable reading of the pixel 400, including of any ROM (or other memory) stored in the set of diode weighting elements 302 and of any eDRAM (or other memory) stored in the memory element 442.

Figure 6:
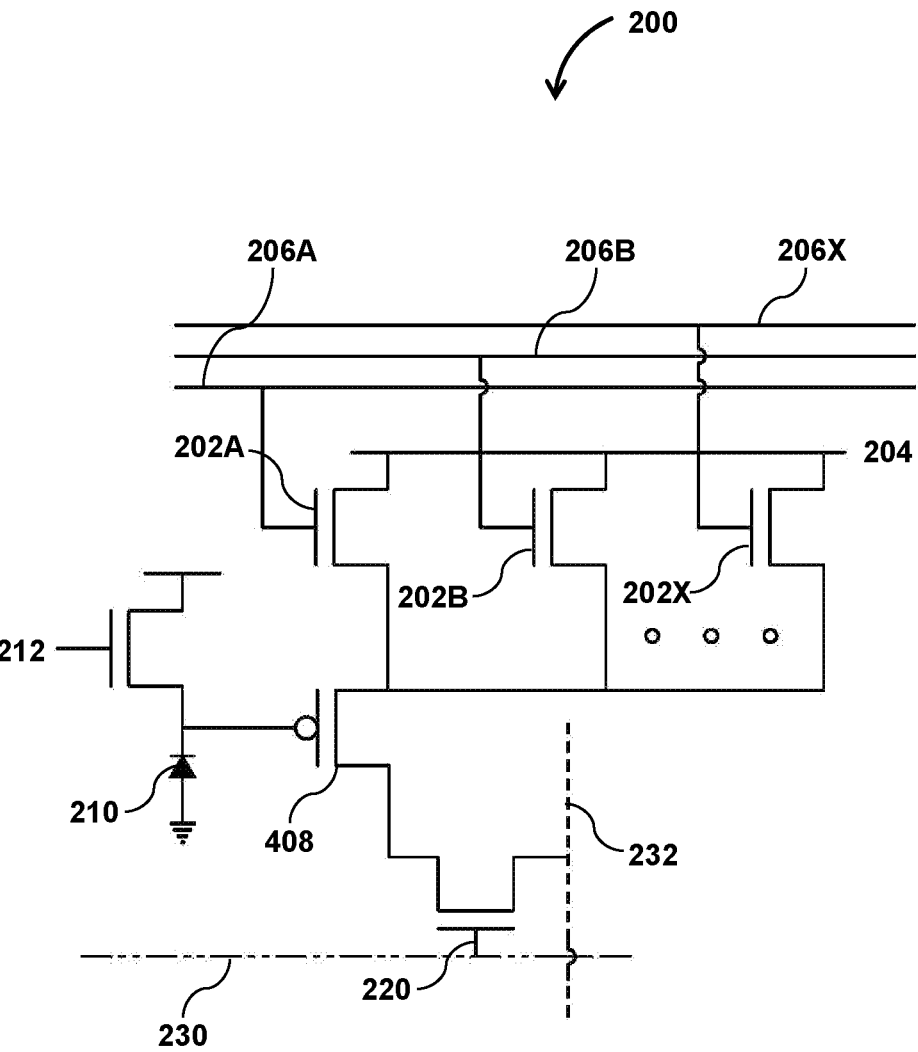
FIG. 6 is an example circuit diagram depicting a multi-bit, multi-kernel ROM embedded pixel with a set of transistor weighting elements and integrated eDRAM using p-channel metal-oxide-semiconductor (pMOS) technology, according to some embodiments.

FIG. 6 is an example circuit diagram depicting a multi-bit, multi-kernel ROM embedded pixel 600 with a set of transistor weighting elements and integrated eDRAM using p-channel metal-oxide-semiconductor (pMOS) technology. The pixel 600 is described with respect to elements similar to those described in reference to FIG. 2, which may be any appropriate elements as previously described. The pixel 600 contains an amplifying transistor 408, which may be a pMOS transistor. The amplifying transistor 408 may receive as input output of a photodiode 210 (which may be an gating input) and output of a set of transistor weighting elements 202 (which may be a source input).

The amplifying transistor 408 may further be connected in series with a dynamic memory element (such as the memory element 442 of FIG. 4), where the memory element may function as eDRAM or as previously described in reference to other example embodiments. The set of transistor weighting elements 202 may function as ROM or as previously described in reference to other example embodiments. The set of transistor weighting elements 202 may instead be a set of diode weighting elements, as previously described in reference to FIGS. 3 and 5. A pMOS amplifier transistor may have advantages associated with PMOS fabrication, such as case of fabrication and zero current at zero gate voltage, and advantages associated with pMOS performance, such as better linearity for analog computations.

The output of the set of transistor weighting elements 202 as gated by the amplifying transistor 408 may be further gated by a second amplifying transistor associated with a memory element. The output of the set of diode weighting elements 302 as switched by the amplifying transistor may be read using a word line 230 and bit line 232, including using a select transistor 220. The output of multiple sensors or pixels 600 may be read in a sensor array. Multiple sensors or pixels 600 (or other pixels) may be connected to each of the parallel input lines 206, or to some of a set of input lines 206 such that multi-channel and/or multi-kernel calculations may take place at some or all of the pixels or sensors of the sensor array. The amplifying transistor 208 and the select transistor 220 may enable reading of the pixel 600, including of any ROM (or other memory) stored in the set of transistor weighting elements 202.

The example pixels described herein (e.g., the pixels 200, 300, 400, 500, and 600 of FIGS. 2-6) above are shown as illustrative examples. Elements of each of the pixels may be replaced, combined, augmented, etc. by elements of other pixels. Multiple types of pixels may be used together.

For a pixel exposed to increasing amounts of light, measured in candela or other appropriate units, the pixel output voltage may increase as a function of transistor weight width for the set of weighting elements, width to length ratio (e.g., W/L), or another increase in the volume of the channel, and decrease with an increase in channel length, decrease in threshold voltage, etc. The pixel output may display both regions of linear increase as a function of light intensity (for example, above a minimum light intensity threshold), regions of supra-linear or near exponential increase as a function of light intensity (for example, near the minimum light intensity threshold or turn-on), and regions where pixel output may approach saturation even as light intensity increases (for example, corresponding to a saturation or saturation and additional linear current conduction region for an amplifying transistor). The pixel output may depend on electrical characteristics of the amplifying transistor, the set of weighting elements, and the photodiode. The pixel output may be analog, where intensity contains information, or may be digital, for example, if rectification is performed. Similar pixel output may be provided by a set of diode weighting elements, which may provide similar linear, exponential, and saturation regions to pixel output, where the output of the set of diode weighting elements is input into the amplifying transistor. The pixel output may also increase as a function of increasing width, W/L, etc. of the set of weighting elements for a constant level of illumination.

For a pixel exposed to a constant level of illumination, pixel output voltage may increase as a function of width, W/L, etc. of the set transistor weighting elements. The pixel output may increase approximately linearly with width, W/L, etc. of the set of transistor weighting elements. The pixel output as a function of level of illumination may depend on the response of the photodiode (or other sensor) to illumination (or another analyte), e.g., it linearity, it's saturation, it's breakdown voltage. The pixel output also may also increase as a function of the level of illumination for a constant width, W/L, etc.

Figure 7:
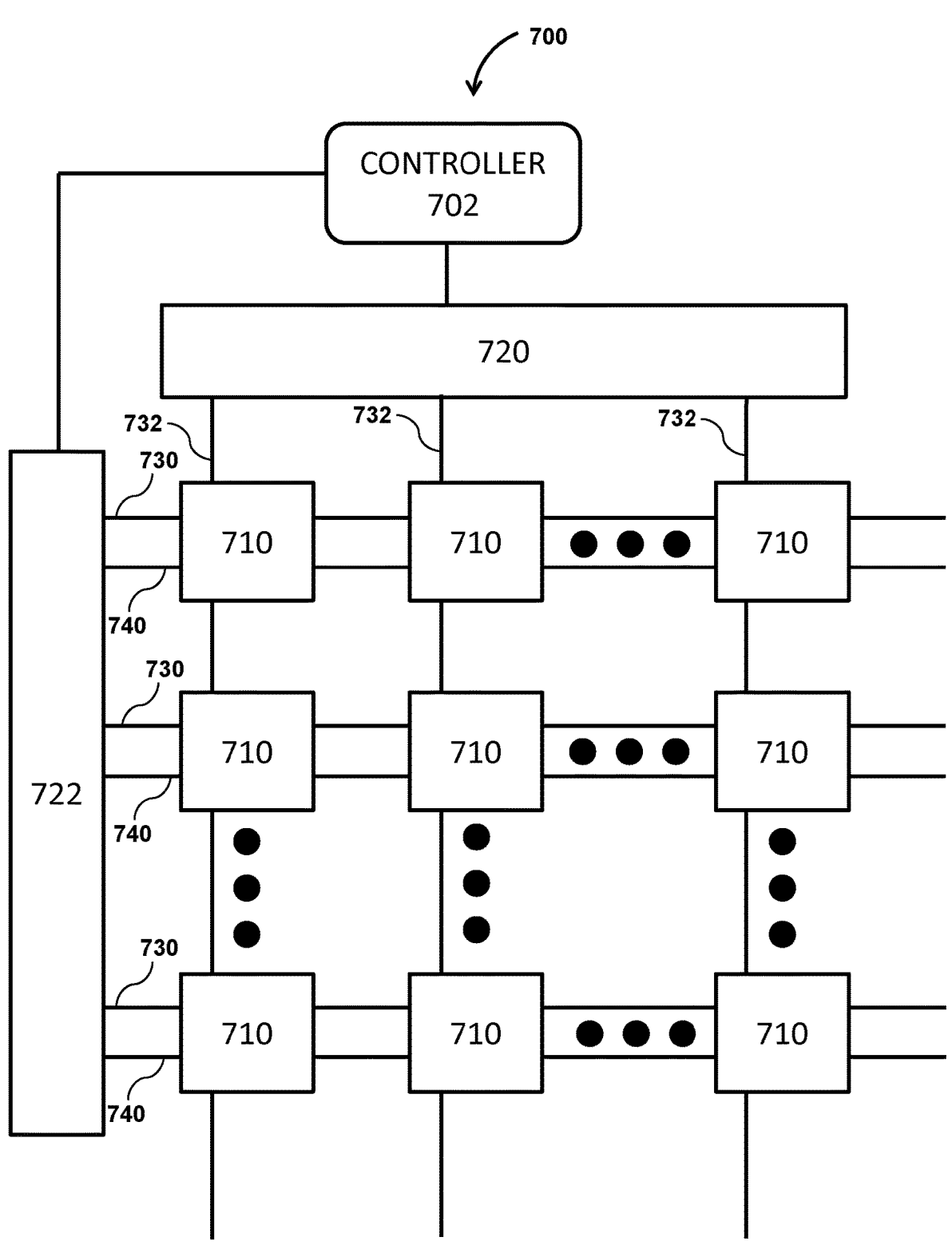
FIG. 7 is a schematic representation of an example array containing multi-bit, multi-kernel ROM embedded pixels, according to some embodiments.

FIG. 7 is a schematic representation of an example array 700 containing multi-bit, multi-kernel ROM embedded pixels. The array 700 is operated by a controller 702, which may control input to a set of pixels 710. The pixels 710 may be those pixels previously described in FIGS. 2-6, such as pixel 200, pixel 300, pixel 400, pixel 500 and pixel 600. The pixels 710 may be different pixels or pixels containing different circuitry, even within the array 700. For example, edge pixels of the array 700 may be different from interior pixels of the array 700. The array 700 may be arranged in rows and columns or any appropriate two-dimensional orientations. The array 700 may alternatively be a one-dimensional array, three-dimensional array, or any other appropriate pixel or sensor array, such as an array along a curved surface. The controller 702 may control one or more sets of peripheral circuitry 720, 722 to read, write, or otherwise access the pixels 710. The controller may provide input, such as to select (e.g., activate) one or more elements of a set of weighting elements via an input line 730. The input line 730 may be multiple input lines, including input lines which each correspond to substantially one kernel. The input line 730 may provide voltage or current to activate one or more element of the set of weighting elements, which may be transistors, diodes, etc. The input line 730 may select which of the weighting elements is to be "read" or convolved with the output of a photosensor of the pixel to be "read". The input line 730 may include a voltage supply, such as Vdd, which may provide a voltage (e.g., a voltage rail) to the set of weighting elements. The voltage supply may be substantially similar when supplied to various elements of the array 700. The input line 730 may transmit a digital or analog input. The input line 730 may contain a reset line, which may reset the set of weighting elements or otherwise allow reset of the pixels 710 to a base state. The same or an additional reset line may reset writable memory, such as a eDRAM memory element (e.g., transistor, capacitor, etc.) The input line 730 may select one or more of the set of weighting elements to be activated and read. The values (e.g., electrical characteristics) of the weighting elements may be hardcoded, such as by fabrication. These values may correspond to ROM. The input line 730 may also contain input lines to write memory values, such as eDRAM. The input line 730 may have dynamic memory input lines, such as to provide values to or activate one or more memory element (e.g., a transistor, a capacitor, etc.) which may operate in parallel or in series with one or more sensor element, set of weighting elements, etc. The input line 730 may also provide power (for example, by supply voltage) for one or more amplification, filtering, rectification, summation, element. While the input line 730 is depicted as being supplied along rows, one or more input line 730 may be supplied along columns, along both rows and columns, by pixel groups (e.g., for a group of two or more pixels, including neighboring pixels, adjacent pixels, pixels corresponding to a similar optical range (e.g., color) which are not adjacent, etc.).

The array may contain a bit line 732, which together with a word line 740, may operate to allow values of the amplifying transistors of various pixels to be read, such as by operation of a select transistor (e.g., the select transistor 220 of FIGS. 2-6). The bit line 732 (and the word line 740) may be multiple bit lines (or word lines), such as bit lines which read values of a column of pixels 710. The bit line 732 may include elements for summation, dot products, difference, etc. which may operate on multiple values output by the pixels 710, such as upon values of multiple pixels 710 of a row, substantially all pixels of a row, etc. The bit line 732 may transmit output signals from the pixels 710, such as to computational elements, storage, logical operations, etc. The bit line 732 (and the word line 740) may contain a first bit line (or a first word line) corresponding to a ROM element, such as the set of weighting elements and a second bit line (or a second word line) corresponding to an eDRAM or other writable memory element. The array may allow for the bit line 732 and the word line 740 to access values from individual pixels 710, such as by any appropriate accessing scheme. The array may also allow for the bit line 732 and the word line 740 to access multiple pixels 710, such as output from multiple of the pixels 710, at the same time. For example, the array may allow for the bit line 732 and the word line 740 to access adjacent pixels and output a dot product of their values, access adjacent pixels and determine a difference, etc. The array may be configured to mirror neurons of layer or part of a layer of a neural network, such as a convolutional neural network (CNN), spiking neural network (SNN), etc. The array may be configured to contain a set of weighting elements which have values corresponding to weighting values of a neural network, such as encoded within the weighting values of the set of weighting elements. The array may be configured to apply the weighting values of the weighting elements for one or more kernels together with the output values of one or more photosensor or other sensor.

Figure 8A:
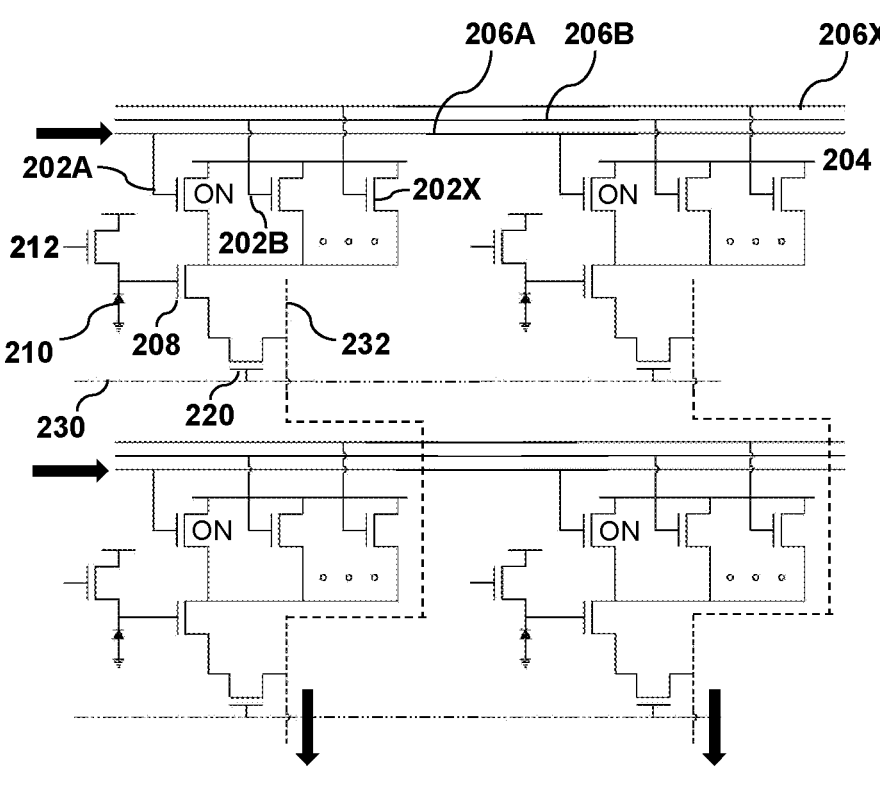
FIGS. 8A-8B are schematic representations of an array level analog computation using multi-bit, multi-kernel circuits; according to some embodiments.
Figure 8B:
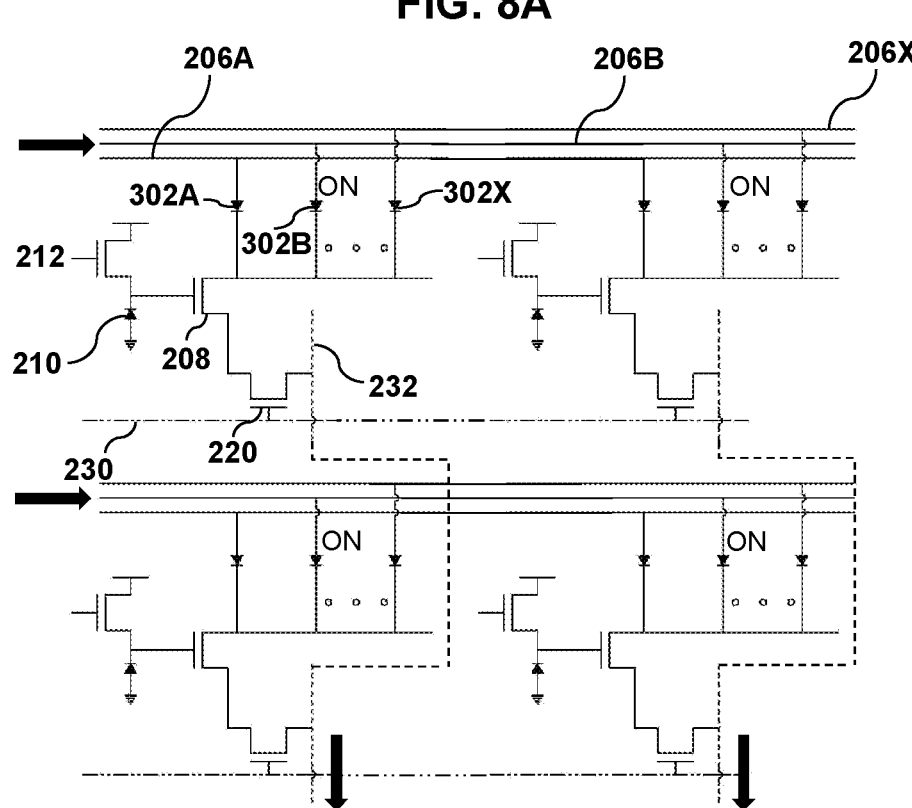

FIGS. 8A-8B are schematic representations of an array level analog computation using multi-bit, multi-kernel circuits. FIG. 8A is a schematic representation of a dot product calculated using an array of multi-bit, multi-kernel ROM embedded pixels with sets of transistor weighting elements. The array is depicted using the elements described in relation to FIG. 2. In FIG. 8A, the input line 206A is activated, which thereby gates the transistor weighting element 202A or each of the pixels ON. The input line 206A may correspond to a kernel. The kernel may correspond to a layer of a neural network, where the weighting of each pixel may correspond to a weight applied to the pixel in a layer of the neural network. The other input lines are not depicted as activated, which may gate the transistor weighting elements of the other transistor weighting elements OFF. The output of the pixels weighted by the transistor weighting element 202A may be used to determine a product output, such as by measuring current output along the bit lines 232.

FIG. 8B is a schematic representation of a dot product calculated using an array of multi-bit, multi-kernel ROM embedded pixels with a set of diode weighting elements. The array is depicted using the elements described in relation to FIG. 3. In FIG. 8B, the input line 206B is activated, which thereby activates (e.g., provides a forward current by) the diode weighting element 302B or each of the pixels ON. The input line 206B may correspond to a kernel. The kernel may correspond to a layer of a neural network, where the weighting of each pixel may correspond to a weight applied to the pixel in a layer of the neural network. The other input lines are not depicted as activated, which may cause the diodes weighting elements of the other diode weighting elements to operate in a low current, zero current, or negative forward current regime, or otherwise be OFF. The output of the pixels weighted by the diode weighting element 302B may be used to determine a product output, such as by measuring current output along the bit lines 232.

An example array level structure for determining analog dot products is provided, but any other appropriate architecture may be used. Additional arrangements between pixels, including orientation of bit lines, word lines, select transistors, etc. may be used to produce mathematical operations between the output of individual pixels such as dot product, summation, vector matrix multiplication, etc. Additional arrangements may include storage of output of the pixels to one or more storage element, such as for comparator operations, later usage, difference determination, etc. The array level structure may also or instead include other elements of machine learning or neural network architecture, such as neural network neuron architecture.

Implementation of the pixel design scheme may be monolithic, where the photodetector, pixel, or other sensor technology may occupy the same chip or circuit substrate as memory or logic, or may be various levels of heterogeneous, where the photodetector, pixel, or other sensor occupy a first chip which may be integrated with a one or more additional chip containing memory or logic. Monolithic integration may include integration of elements on a single chip, such as by a set of fabrication processes on the same chip or wafer. Homogeneous integration may include integration of substantially similar chips, such as containing the same technology, having the same design, with one another. Heterogeneous integration may include integration of substantially different chips, such as corresponding to different circuit elements, different technology nodes, etc., with one another. Implementation of the pixel design scheme may include a substantially one-to-one relationship between pixels and corresponding memory or logic units, such as between a photo diode on a pixel chip and a set of weighting elements on a memory chip. Implementation may occur without significant operations occurring on pixel output—that is, output from a pixel may travel un-multiplexed or otherwise experiencing data loss or convolution to a memory or logic device corresponding to the pixel before experiencing further processing. This may allow the pixel and memory or logic to function as circuit without interference from other pixel and memory or logic units to preserve data while allowing optimization of pixel and memory or logic fabrication, such as in different technology nodes, in different materials, etc. Implementation may include three-dimensional (3D) integration of one or more component, such as CMOS 3D integration.

Figure 9:
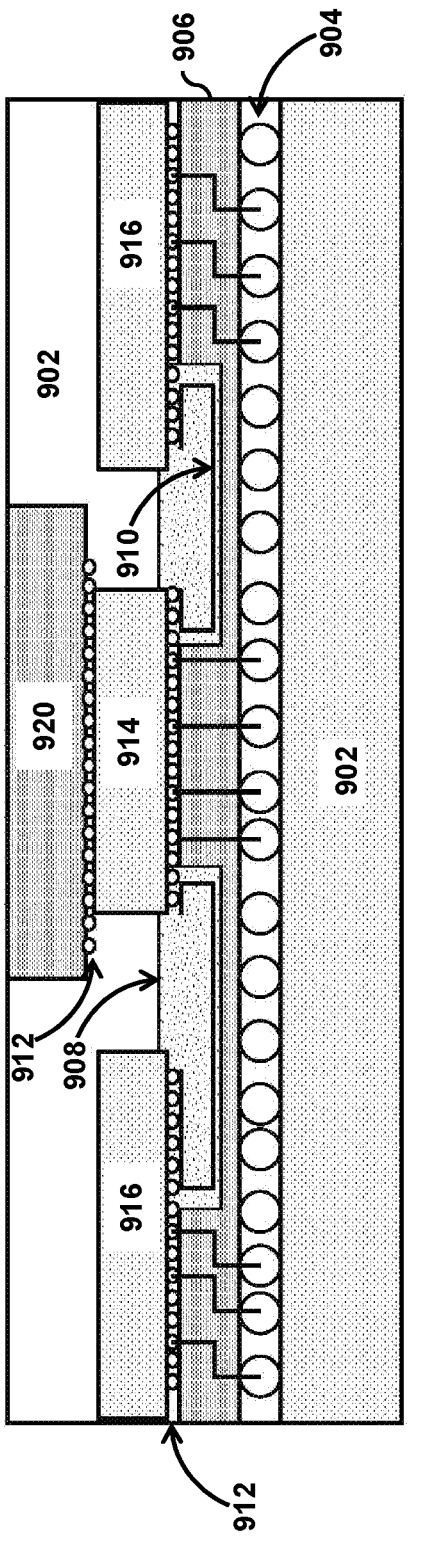
FIG. 9 is a schematic representation of an example integration scheme, according to some embodiments.

FIG. 9 is a schematic representation of an example integration scheme. A photodetector or pixel layer 920, in which the photodetector and at least some of the pixel circuitry are integrated (e.g., fabricated together) is heterogeneously integrated with a memory chip 914 through the use of a heterogeneous solder bump 912 structure. Each pixel may be joined to memory (e.g., ROM, eDRAM, etc.) circuitry on the memory chip 914, including to a corresponding memory element on the memory chip. Each pixel may be joined to a corresponding memory element (for example, a set of weighting elements) such as in a one-to-one relationship. For example, each pixel of the pixel layer 920 may have an output, such as corresponding to a photodiode output which is electrically connected to an input in a unit of the memory chip 914, such as corresponding to an input of an amplifying transistor (such as a gate) or other input. The memory chip 914 may be divided into units, including spatially, which correspond to the pixels of the pixel layer 920. Electrical contacts may electrically connect each pixel to a corresponding analogous unit of the memory chip 914. For example, the memory chip 914 may have architecture corresponding to each of the pixels, including architecture which is spaced substantially similarly to the pixel architecture. The memory chip 914 may be organized in a manner analogous to the organization of the pixel layer 920, including being divided into "quasi-pixels" or physical units analogous to the pixels of the pixel layer 920 which may not contain photodetectors or other sensors. The memory chip 914 may then be joined to a read-out circuit (ROC) 916, which may be or include a transimpedance amplifier (TIA), analog to digital converter (ADC), application-specific integrated circuit (ASIC), etc. The pixel layer 920, memory chip 914, and other circuits may be joined using fan-out wafer-level packaging (FOWLP) or another appropriate packaging method. The implementation scheme may integrate three different signal and design domains, including photonic elements, analog elements, and digital elements. The implementation scheme may also include a silicon interposer or silicon layer 906 which may connect one or more other chip (or smaller chip or chiplet) including through the use of through silicon vias (TSVs) 910. The implementation scheme may include one or more infill layer 908, including passivation layers, filler layers, inert layers, etc. The implementation scheme may further include a printed circuit board (PCB) 902 for connection with other electrical components such as a power supply, bus, transmitter, etc. Any layer may be connected to another layer via packaging solder bumps 904 of appropriate size, packaging balls, pins, etc.

Figure 10:
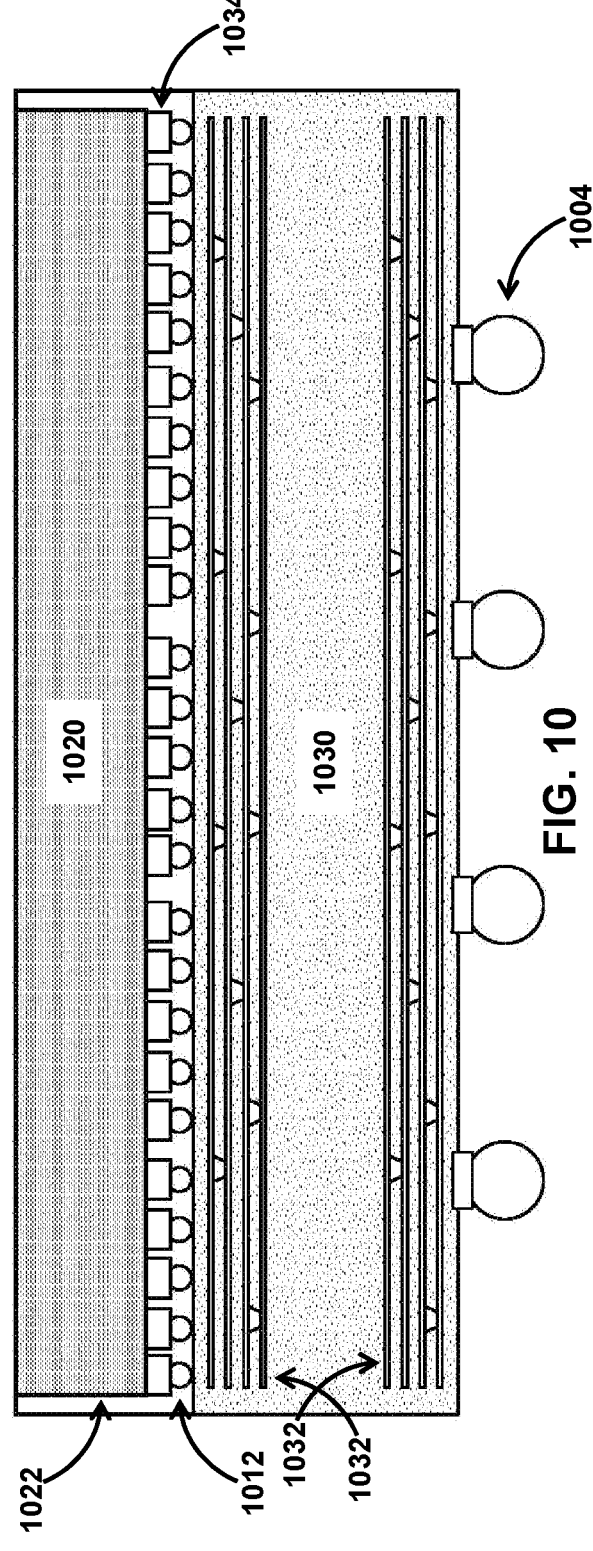
FIG. 10 is a schematic representation of an example monolithic integration scheme; according to some embodiments.

FIG. 10 is a schematic representation of an example monolithic integration scheme. Another example implementation scheme is depicted below. In this example, a photodetector and pixel layer 1020 is monolithically integrated with memory, ROC, or ASIC, which is fabricated within the photodetector and pixel layer 1020. In some embodiments, the chip structure containing the photodetector and pixel layer 1020 may be fabricated on 12 nm or 22 nm transistor technology. Each pixel may be joined to memory (e.g., ROM, eDRAM, etc.) circuitry which is fabricated within the photodetector and pixel layer 1020 or in the same chip as the photodetector and pixel layer 1020. Each pixel may contain memory circuitry within the pixel architecture (e.g., in a proximal layer of fabrication). Each pixel may be joined to memory circuitry, such as by interconnects, which are in other layers of the device. The memory may be divided into units corresponding to each of the pixels or pixel divisions. The memory may be fabrication using the same technology node as the pixel architecture, including using the same technology mode but different fabrication techniques (for example, using both FinFET technology and floating gate technology). Memory may be fabricated in a buried layer, e.g., underneath the photosensor (or other sensor), in the area between pixels or photosensors (e.g., in waste areas), or in other areas of the chip. Likewise, the ROC and ASIC elements may also be fabricated on or from the same substrate (silicon or non-silicon substrate such as gallium arsenide (GaAs), mercury cadmium telluride (HgCdTe), etc.). Each pixel may contain circuitry of the ROC or ASIC within the pixel architecture (e.g., in a proximal layer of fabrication). Each pixel may be joined to ROC or ASIC circuitry, such as by interconnects, which are in other layers of the device. The circuitry may be divided into units corresponding to each of the pixels or pixel divisions. The circuitry may be fabrication using the same technology node as the pixel architecture, including using the same technology mode but different fabrication techniques (for example, using both FinFET technology and standard FET technology). One or more layers of underfill 1022, bump metallization 1034, solder bumps 1012, and package balls 1004 may be used to join the monolithically integrated pixel circuits to a packaging substrate 1030, which may have buildup layers 1032, such as to facilitate interconnections. In some embodiments, the transistors or other elements of the pixel or sensor technology and one or more of the memory or logic technology may come from different technology nodes (for example, 12 nm and 22 nm transistor technology nodes) or come from the same node but have different fabrication architecture.

Heterogeneous integration may include one or more element of homogeneous or monolithic integration. For example, pixels and memory may be integrated monolithically or homogeneously, and then joined heterogeneously to logical circuitry.

Figure 11:
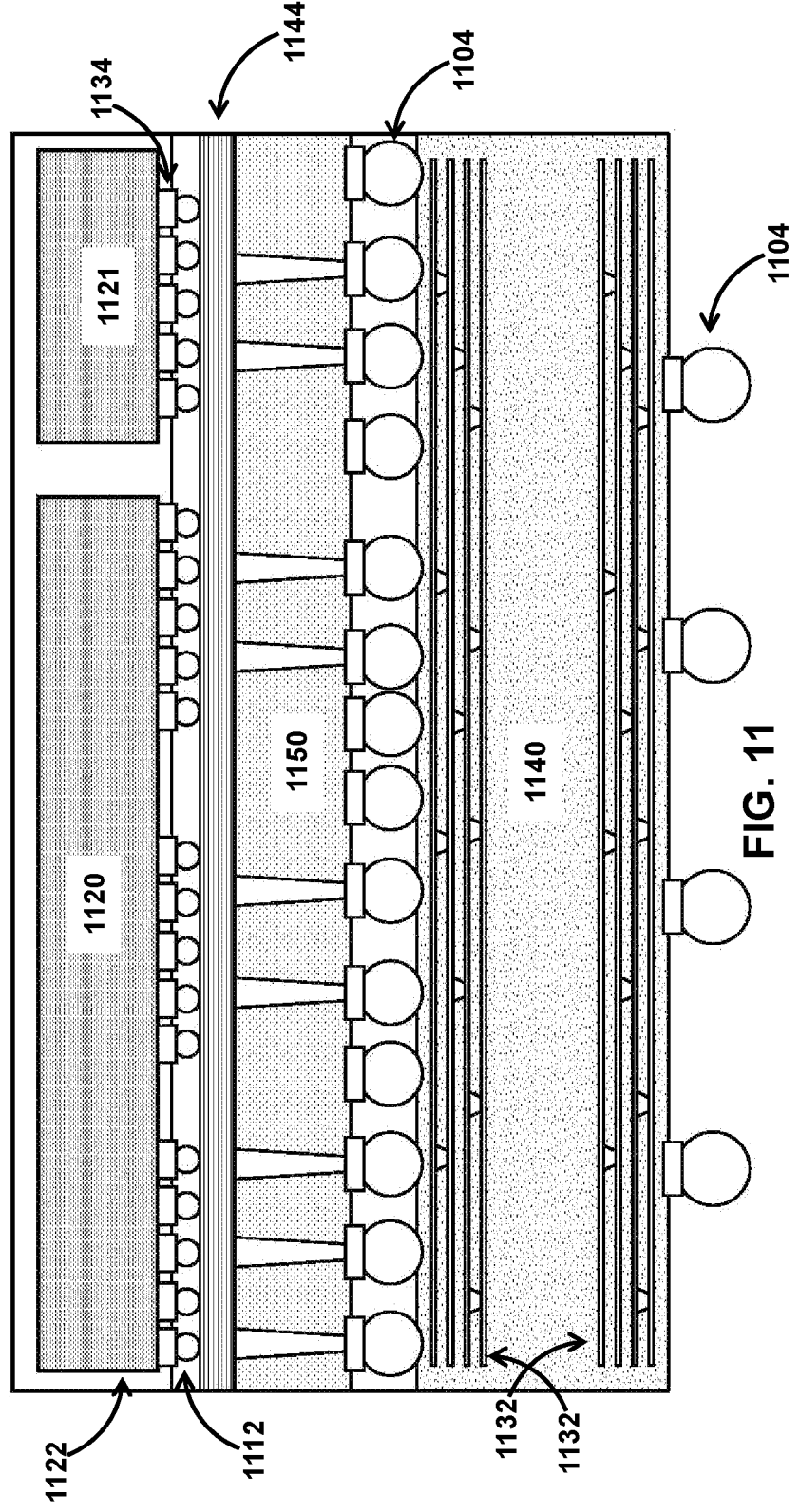
FIG. 11 is a schematic representation of an example integration scheme; according to some embodiments.

FIG. 11 is a schematic representation of an example integration scheme. A photodetector and pixel layer 1120 is monolithically integrated, including with memory (e.g., eDRAM) and a ROC. The monolithic integration of the memory with the pixel layer 1120 may include integration elements as previously described in reference to FIG. 10. The monolithic sensor device containing the photodetector and pixel layer 1120 is then heterogeneously integrated with a field programmable gate array (FPGA) 1121. The FPGA 1121 may instead be any other programmable logic circuitry or other logic or processor chip. The implementation scheme may include a redistribution layer (RDL) 1144 for improved access, integration, and connection between layers. One or more layers of underfill 1122, bump metallization 1134, solder bumps 1112, and solder balls 1104 (e.g., packaging balls) may be used to join the circuits to a packaging substrate. One or more layers may contain TSVs 1150, may have buildup layers 1132, such as to facilitate interconnections, or any other appropriate interconnection elements.

Figure 12:
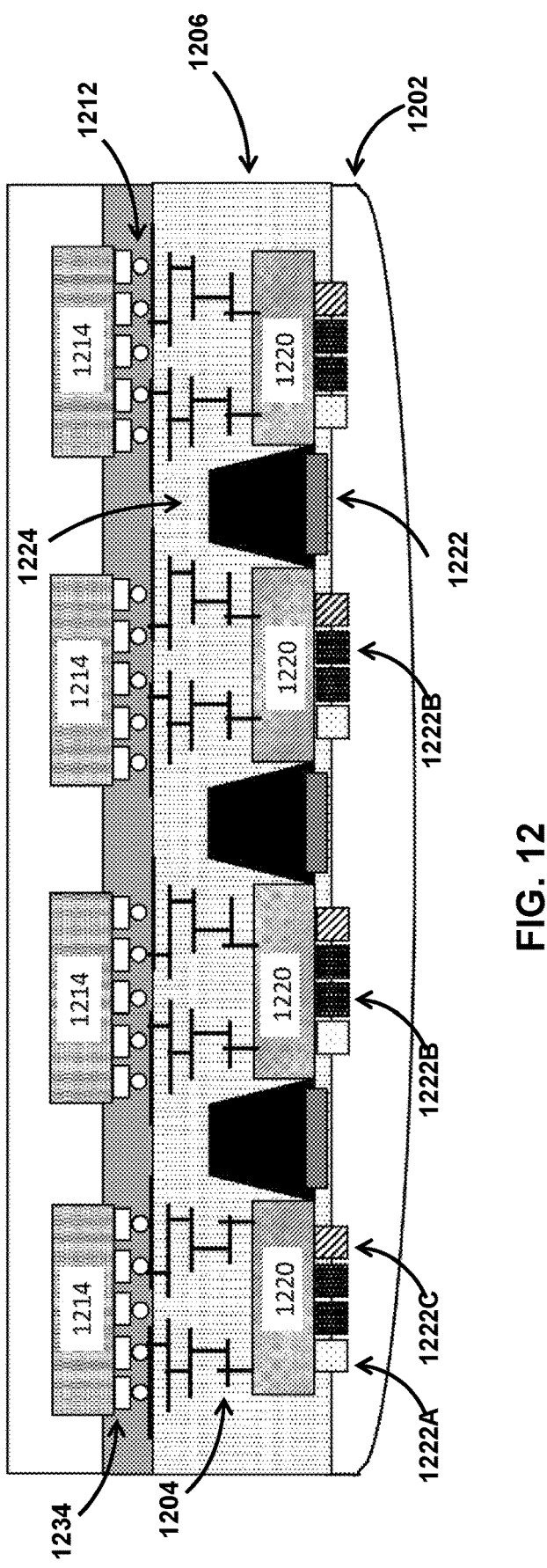
FIG. 12 is a schematic representation of an example multi-pixel integration scheme, according to some embodiments.

FIG. 12 is a schematic representation of an example multi-pixel integration scheme. Multiple image sensors 1220 are depicted, which contain pixels 1222, which may be sub-pixels such that pixel 1222A corresponds to a red pixel or sub-pixel, pixel 1222B corresponds to a green pixel or sub-pixel, an pixel 1222C corresponds to a blue pixel or sub-pixel. Each of the image sensors 1220 may have one or more pixel (or sub-pixels), including multiple pixels of with the same emission or detection wavelength, such as depicted for the multiple pixels 1222B of the image sensors 1220. The pixels 1222 may instead be color filters, used to select a wavelength of light for detection, including color filters which may be turned on and off. The image sensors 1220 may be contact image sensors (CIS). The image sensors 1220 may be surrounded by a light shield 1202, which may cover the sensor face of the image sensors 1220. The image sensors 1220 may have electrical contacts which extend through a bulk of a support 1206 of the image sensors 1220, such as back end of line (BEOL) circuitry 1204 joining the image sensors 1220 to one or more contacts on the back side of the support 1206. The BEOL circuitry 1204 may include contact pads, which may be joined by wafer-to-wafer (or hybrid bonding, wire bonding, or any other appropriate bonding procedure) to one or more in-pixel memory or logic tile 1214, where the tile may be a chiplet, a chip, or any other appropriate unit of circuitry. The bonding may occur via bump metallization 1234, solder bumps 1212, or the like. The in-pixel memory or logic tile 1214 may contain elements of ROM, eDRAM, ROC, ASIC, etc. as previously described. The in-pixel memory or logic tile 1214 may be heterogeneously integrated with the image sensors 1220 or the support 1206. The in-pixel memory or logic tiles 1214 may be the same or different. For example, the in-pixel memory or logic tiles 1214 for edge pixels may be different (such as containing the same types of circuitry but with different weighting values) from the in-pixel memory or logic tiles 1214 for center pixels. The support 1206 may also contain pixel isolation elements 1224, which may be trenches filled with insulating material, and one or more light shield 1222 restricting light exposure of the bulk of the support 1206 outside of the image sensors 1220 or to parts of the image sensors 1220.

Figure 13:
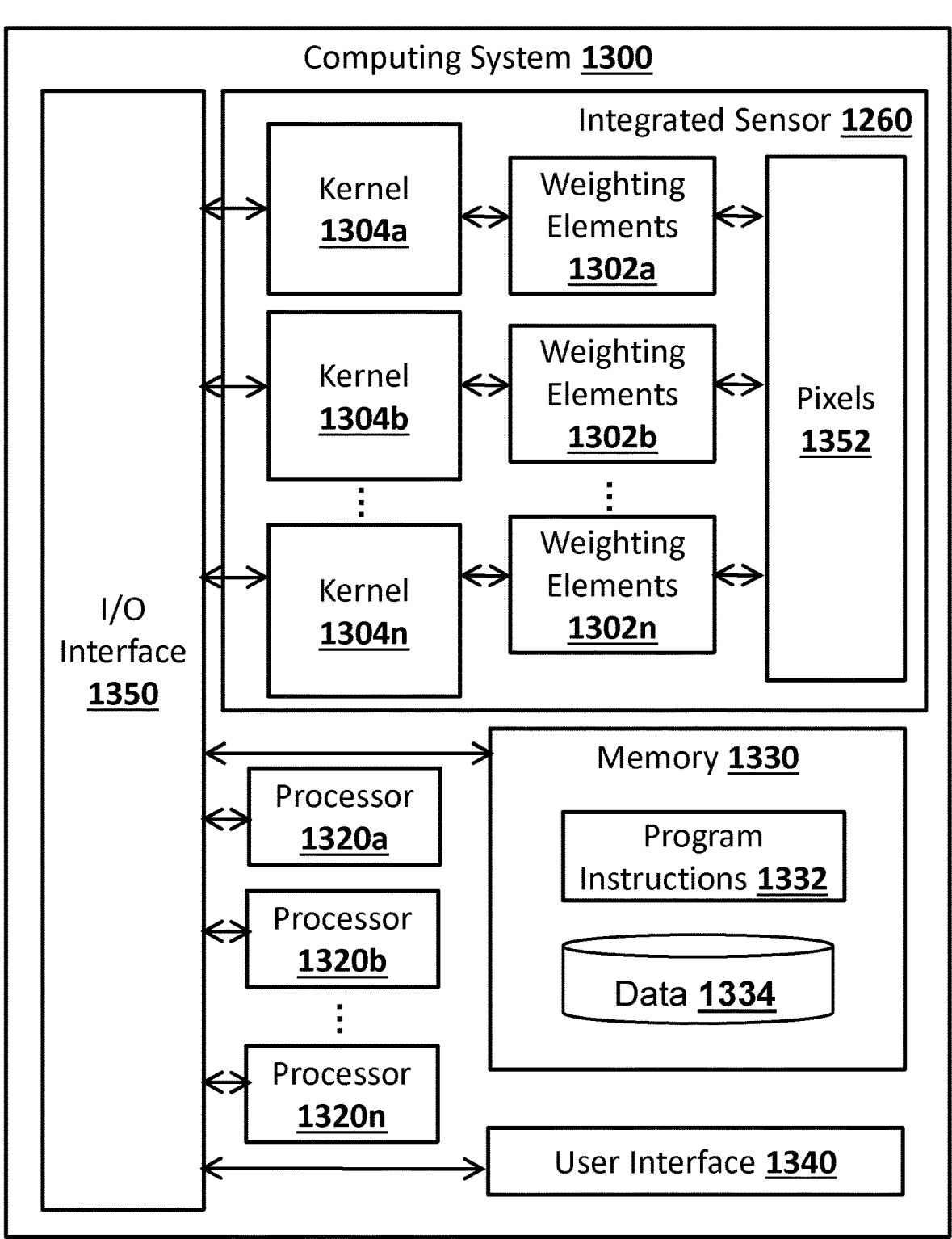
FIG. 13 illustrates an example computing system using processing in pixel; according to some embodiments.

FIG. 13 illustrates an example computing system using processing in pixel. Various portions of systems and methods described herein may include or be executed on one or more computing systems similar to computing system 1300. Further, processes and modules described herein may be executed by one or more processing systems similar to that of computing system 1300.

Computing system 1300 may include one or more processors (e.g., processors 1320a-1320n) coupled to system memory 1330, and a user interface 1340 via an input/output (I/O) interface 1350. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1300. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1330). Computing system 1300 may be a uni-processor system including one processor (e.g., processor 1320a-1320n), or a multi-processor system including any number of suitable processors (e.g., 1320a-1320n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1300 may include a plurality of computing devices (e.g., distributed computing systems) to implement various processing functions.

Computing system 1300 may include one or more kernel (e.g., kernels 1304a-1304n), coupled to system memory 1330, and a user interface 1340 via an input/output (I/O) interface 1350. Kernels 1304a-1304n may also be coupled to weighting elements 1302a-1302n and to pixels 1352. The kernels 1304a-1304n may operate on outputs of the pixels 1352, which may allow transmission (e.g., pass-through) of the outputs of the weighting elements 1302a-1302n, e.g., be weighted by the weighting elements 1302a-1302n. The weighting elements 1302a-1302n may select for outputs of the pixels 1352 corresponding to each of the kernels 1304a-1304n. The pixels 1352 may correspond to multiple of the kernels 1304a-1304n, such as by selection by the weighting elements 1302a-1302n. The pixels 1352 may correspond to multiple photosensors. The pixels 1352 may instead correspond to multiple sensors. The weighting elements 1302a-1302n may be controlled by one or more of the kernels 1304a-1304n. The kernels 1304a-1304n may determine values of the weighting elements 1302a-1302n. The weighting elements 1302a-1302n may be transistors, diodes, or any other appropriate elements as previously described. The pixels 1352, the weighting elements 1302a-1302n or another computation element may contain additional memory elements, such as ROM (which may be provided by the weighting elements 1302a-1302n), eDRAM, accumulation elements, etc. which may be readable or readable and writable memory. The pixels 1352 may be connected to one or more of the weighting elements 1302a-1302n. The weighting elements $1302a$-$1302n$ may be connected to one or more of the kernels $1304a$-$1304n$, as previously described. The pixels 1352 may be controlled by one or more reset element, such as a reset element (not depicted) in communication with the I/O interface 1350 or controlled by one or more of the processors $1320a$-$1320n$. The pixels 1352 may be exposed to input, such as light (e.g., in the case of a photosensor) or other input, an analyte (such as temperature), or other sensing material. The pixels 1352 may comprise transistors, diodes, etc.

The user interface 1340 may comprise one or more I/O device interface, for example to provide an interface for connection of one or more I/O devices to computing system 1300. The user interface 1340 may include devices that receive input (e.g., from a user) or output information (e.g., to a user). The user interface 1340 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. The user interface 1340 may be connected to computing system 1300 through a wired or wireless connection. The user interface 1340 may be connected to computing system 1300 from a remote location. The user interface 1340 may be in communication with one or more other computing systems. Other computing units, such as located on remote computer system, for example, may be connected to computing system 1300 via a network.

System memory 1330 may be configured to store program instructions 1332 or data 1334. Program instructions 1332 may be executable by a processor (e.g., one or more of processors $1320a$-$1320n$) to implement one or more embodiments of the present techniques. Program instructions 1332 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1330 may include a tangible program carrier having program instructions stored thereon. A tangible program carrier may include a non-transitory computer readable storage medium. A non-transitory computer readable storage medium may include a machine-readable storage device, a machine-readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random-access memory (SRAM), synchronous dynamic RAM (SDRAM)), bulk storage memory (e.g., CD-ROM and/or DVD-ROM, hard-drives), or the like. System memory 1330 may include a non-transitory computer readable storage medium that may have program instructions stored thereon that are executable by a computer processor (e.g., one or more of processors $1320a$-$1320n$) to cause the subject matter and the functional operations described herein. A memory (e.g., system memory 1330) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1350 may be configured to coordinate I/O traffic between processors $1320a$-$1320n$, kernels $1302a$-$1304n$, system memory 1330, user interface 1340, etc. I/O interface 1350 may perform protocol, timing, or other data transformations to convert data signals from one component (e.g., system memory 1330) into a format suitable for use by another component (e.g., processors $1320a$-$1320n$). I/O interface 1350 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing system 1300 or multiple computing systems 1300 configured to host different portions or instances of embodiments. Multiple computing systems 1300 may provide for parallel or sequential processing/execution of one or more portions of the techniques described herein.

Those skilled in the art will appreciate that computing system 1300 is merely illustrative and is not intended to limit the scope of the techniques described herein. Computing system 1300 may include any combination of devices or software that may perform or otherwise provide for the performance of the techniques described herein. For example, computing system 1300 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computing system 1300 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computing system 1300 may be transmitted to computing system 1300 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine-readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (e.g., meaning having the potential to), rather than the mandatory sense (e.g., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, e.g., encompassing both "and" and "or." The term "each" does not require an exact relationship or that absolutely all elements thus described are involved, e.g., each may indicate substantially all and does not require participation of all elements identified as each. The term "each" may indicate a substantially one-to-one relationship, a one-to-many relationship, etc. Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B may include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, e.g., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and may be implemented in the form of data that causes functionality to be invoked, e.g., in the form of arguments of a function or API call. To the extent bespoke noun phrases (and other coined terms) are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1A. An integrated circuit comprising: an amplifier; a sensor electrically connected to a first input of the amplifier; and a set of weights electrically connected to a second input of the amplifier, wherein the amplifier is configured to weight an output of the sensor according to an output of the set of weights.

2A. The integrated circuit of embodiment 1A, further comprising a pixel, wherein the sensor comprises a photosensor, wherein the set of weights comprises parallel weights, and wherein the amplifier comprises an amplifying transistor.

3A. The integrated circuit of embodiment 2A, wherein the photosensor comprises a photodiode electrically connected to a gate of the amplifying transistor.

4A. The integrated circuit of embodiment 2A, wherein the parallel weights are electrically connected to a source of the amplifying transistor.

5A. The integrated circuit of embodiment 1A, wherein the set of weights comprises non-volatile memory, wherein non-volatile memory comprises at least one of a set of transistors, a set of diodes, read-only memory (ROM), random access-memory (RAM), magnetoresistive RAM (MRAM), resistive RAM (RRAM), phase-change RAM (PCRAM), ferroelectric RAM (FeRAM), or a combination thereof.

6A. The integrated circuit of embodiment 1A, further comprising read circuitry, where an output of the amplifier is readable by operation of the read circuitry.

7A. The integrated circuit of embodiment 6A, wherein the read circuitry is operable by input of a bit line and input of a word line.

8A. The integrated circuit of embodiment 1A, further comprising eDRAM circuitry.

9A. The integrated circuit of embodiment 8A, wherein the eDRAM circuitry comprises a writable transistor and a second amplifying transistor, wherein the eDRAM circuitry is electrically connected to a gate of the second amplifying transistor and wherein an output of the amplifier is electrically connected to a source of the second amplifying transistor.

10A. The integrated circuit of embodiment 1A, wherein the set of weights correspond to a set of values of one or more kernel.

11A. The integrated circuit of embodiment 1A, wherein the sensor comprises a pixel, wherein the set of weights comprises ROM, wherein the pixel and the ROM are monolithically integrated.

12A. The integrated circuit of claim 11, further comprising at least one of eDRAM circuitry, read out circuitry (ROC), analog to digital converters (ADC), application-specific integrated circuitry (ASIC), and a combination thereof, wherein the at least one of eDRAM circuitry, ROC, ADS, ASIC, and the combination thereof is monolithically or heterogeneously integrated with the pixel.

13A. The integrated circuit of claim 1, wherein the sensor comprises a pixel, wherein the set of weights comprises ROM, wherein the pixel and ROM are heterogeneously integrated and wherein the pixel and ROM correspond to different technology nodes.

14A. The integrated circuit of claim 13, further comprising at least one of eDRAM circuitry, read out circuitry (ROC), analog to digital converters (ADC), application-specific integrated circuitry (ASIC), and a combination thereof, wherein the at least one of eDRAM circuitry, ROC, ADS, ASIC, and the combination thereof is heterogeneously integrated with the pixel and wherein at the least one of eDRAM circuitry, ROC, ADS, ASIC, and the combination thereof corresponds to a different technology node than the pixel.

15A. An integrated circuit array comprising: an array of cells, each of the cells comprising the integrated circuit of any one of embodiments 1A to 14A.

16A. The integrated circuit array of embodiment 15A, wherein the cells are arrayed in at least two dimensions.

17A. A system comprising: the array of cells of any one of embodiments 15A to 16A; one or more processor; and a tangible, non-transitory, machine-readable medium storing instructions that when executed by the one or more processors effectuate operations comprising: selecting one or more weights of the set of weights; providing sensor input to the array; and determining outputs of the cells of the array corresponding to the sensor input based on the selected one or more weights.

18A. The system of embodiment 17A, wherein selecting one or more weights of the set of weights comprises activating one or more weights corresponding to a kernel; and wherein determining outputs of the cells of the array comprises determining outputs of the cells of the array corresponding to the sensor input weighted according to the selected one or more weights of the kernel 19A. The system of embodiment 17A, comprising a neural network, the operations further comprising providing the outputs of the cells of the array to the neural network.

20A. A method of integrating elements of the integrated circuit of any one of embodiments 1A to 14A.

21A. A method of integrating elements of the integrated circuit array of any one of embodiments 15A to 16.

22A. The method of any one of embodiments 20A or 21A further comprising: steps for monolithic integration.

23A. The method of any one of embodiments 20A or 21A further comprising: steps for heterogeneous integration.

1B. An integrated circuit comprising: a select transistor having a gate electrically connected to a word line and an output of the select transistor electrically coupled to a bit line; a sensor structure; and a first memory structure, wherein the sensor structure and the first memory structure are operably coupled to the select transistor.

2B. The integrated circuit of embodiment 1B, wherein the sensor structure comprises a sensor.

3B. The integrated circuit of embodiment 2B, wherein the sensor is a photodiode.

4B. The integrated circuit of embodiment 2B, wherein the sensor further comprises a transimpedance amplifier.

5B. The integrated circuit of embodiment 2B, wherein the sensor is a photosensor.

6B. The integrated circuit of embodiment 2B, wherein the sensor is an infrared sensor.

7B. The integrated circuit of embodiment 2B, wherein the sensor is a terahertz sensor.

8B. The integrated circuit of embodiment 2B, wherein the sensor structure further comprises a second memory structure.

9B. The integrated circuit of embodiment 8B, wherein the second memory structure further comprises a reset transistor.

10B. The integrated circuit of embodiment 8B, wherein the second memory structure is electrically connected in series with a reset transistor.

11B. The integrated circuit of embodiment 8B, wherein the second memory structure and the sensor are electrically in parallel.

12B. The integrated circuit of embodiment 2B, wherein the sensor structure further comprises an amplifying transistor.

13B. The integrated circuit of embodiment 12B, wherein sensor structure is electrically connected with a gate of the amplifying transistor.

14B. The integrated circuit of embodiment 12B, wherein the first memory structure is electrically connected with an input of the amplifying transistor.

15B. The integrated circuit of embodiment 14B, wherein the input of the amplifying transistor is at least one of a source or drain of the amplifying transistor.

16B. The integrated circuit of embodiment 14B, wherein an output of the amplifying transistor is electrically connected to an input of the select transistor.

17B. The integrated circuit of embodiment 14B, wherein the output of the amplifying transistor is at least one of a source or drain of the amplifying transistor.

18B. The integrated circuit of embodiment 14B, wherein the amplifying transistor is a PMOS transistor.

19B. The integrated circuit of embodiment 1B, wherein the first memory structure comprises read only memory.

20B. The integrated circuit of embodiment 1B, wherein the first memory structure comprises a set of multiple memory elements in parallel.

21B. The integrated circuit of embodiment 20B, wherein each of the set of multiple memory elements corresponds to an input.

22B. The integrated circuit of embodiment 21B, each input corresponds to a kernel.

23B. The integrated circuit of embodiment 20B, wherein each of the set of multiple memory elements is operably coupled to at least one voltage rail.

24B. The integrated circuit of embodiment 20B, where the first memory structure comprises a set of input lines and wherein each of the set of multiple memory elements is operably coupled to at least one of the set of input lines.

25B. The integrated circuit of embodiment 20B, wherein each of the set of multiple memory elements is a transistor.

26B. The integrated circuit of embodiment 25B, wherein each transistor is operably coupled to at least one input line.

27B. The integrated circuit of embodiment 25B, wherein a gate of each transistor is operably coupled to at least one input line.

28B. The integrated circuit of embodiment 25B, wherein each transistor has a characteristic threshold voltage.

29B. The integrated circuit of embodiment 28B, wherein each characteristic threshold voltage is different.

30B. The integrated circuit of embodiment 25B, wherein each transistor has a determined width to length ratio.

31B. The integrated circuit of embodiment 30B, wherein each determined width to length ratios is different.

32B. The integrated circuit of embodiment 20B, wherein each of the set of multiple memory elements is a diode.

33B. The integrated circuit of embodiment 32B, wherein each diode is operably coupled to at least one input line.

34B. The integrated circuit of embodiment 32B, wherein an anode of each diode is operably coupled to at least one input line.

35B. The integrated circuit of embodiment 32B, wherein each diode has a characteristic turn on voltage.

36B. The integrated circuit of embodiment 32B, wherein each diode has at least one distinctive forward current characteristic.

37B. The integrated circuit of embodiment 1B, further comprising a third memory structure, wherein the third memory structure is operably coupled to the select transistor.

38B. The integrated circuit of embodiment 37B, wherein the third memory structure comprises embedded dynamic random-access memory.

39B. The integrated circuit of embodiment 37B, wherein the third memory structure comprises dynamic random-access memory.

40B. The integrated circuit of embodiment 37B, wherein the third memory structure comprises a storage node.

41B. The integrated circuit of embodiment 37B, wherein the third memory structure comprises an access transistor.

42B. The integrated circuit of embodiment 41B, wherein the access transistor is operably coupled to a second bit line.

43B. The integrated circuit of embodiment 37B, further comprising a first amplifying transistor and a second amplifying transistor, wherein the third memory structure is operably coupled to the second amplifying transistor and wherein the second amplifying transistor is operably coupled to the first amplifying transistor and to the select transistor.

44B. The integrated circuit of embodiment 43B, wherein the third memory structure is electrically connected to a gate of the second amplifying transistor, wherein an input of the second amplifying transistor is electrically connected to an output of the first amplifying transistor, and wherein an output of the second amplifying transistor is electrically connected to an input of the select transistor.

45B. The integrated circuit of embodiment 44B, wherein the input of the second amplifying transistor is at least one of a source or a drain of the second amplifying transistor.

46B. The integrated circuit of embodiment 44B, wherein the output of the second amplifying transistor is at least one of a source or a drain of the second amplifying transistor.

47B. The integrated circuit of embodiment 37B, wherein the third memory structure comprises a capacitive storage element.

48B. The integrated circuit of embodiment 37B, wherein the first memory structure, the sensor structure, and the third memory structure are connected in series to an input of the select transistor.

49B. The integrated circuit of embodiment 1B, wherein the output of the select transistor is a source of the select transistor and wherein an input of the select transistor is a drain of the select transistor.

50B. The integrated circuit of embodiment 1B, wherein the output of the select transistor is a drain of the select transistor and wherein an input of the select transistor is a source of the select transistor.

51B. The integrated circuit of embodiment 1B, comprising at least one PMOS transistor.

52B. The integrated circuit of embodiment 1B, wherein the sensor structure comprises a pixel.

53B. The integrated circuit of embodiment 1B, wherein the sensor structure comprises a pixel.

54B. The integrated circuit of embodiment 1B, further comprising monolithic integration.

55B. The integrated circuit of embodiment 1B, further comprising heterogeneous integration.

56B. An integrated circuit structure comprising: an array of cells arranged in at least one dimension, wherein each cell comprises at least a first integrated circuit of any one of embodiments 1B to 55B.

57B. The integrated circuit structure of embodiment 56B, further comprising: at least one word line, wherein the at least one word line corresponds to a row of cells and wherein the at least one word line is electrically connected to a gate of the select transistor of each cell of the row of cells.

58B. The integrated circuit structure of embodiment 56B, further comprising: at least one bit line, wherein the at least one bit line corresponds to a column of cells and wherein the at least one bit line is electrically connected to an output of the select transistor of each cell of the column of cells.

59B. The integrated circuit structure of embodiment 56B, further comprising: at least one memory device, wherein cells of the at least one memory device are operably coupled to the cells of the array.

60B. The integrated circuit structure of embodiment 56B, further comprising: at least one logic device, wherein cells of the at least one logic device are operably coupled to the cells of the array.

61B. The integrated circuit structure of embodiment 56B, further comprising: at least one packaging structure, wherein the array is operably coupled to the at least one packaging structure.

62B. The integrated circuit structure of embodiment 56B, further comprising: multiple kernels, wherein each of the multiple kernels is operable as an input to first memory structure of the cells of the array.

63B. A method of fabricating the integrated circuit of any one of embodiments 1B to 55B.

64B. A method of fabricating the integrated circuit structure of any one of embodiments 56B to 62B.

What is claimed is:

1. An integrated circuit comprising:
an amplifier, wherein the amplifier comprises an amplifying transistor;
a sensor electrically connected to a first input of the amplifier, wherein the sensor comprises a photosensor; and
a set of weights electrically connected to a second input of the amplifier,
wherein the set of weights comprises parallel weights,
wherein the amplifier is configured to weight an output of the sensor according to an output of the set of weights, and
wherein the parallel weights are electrically connected to a source of the amplifying transistor.

2. The integrated circuit of claim 1, comprising a pixel.

3. The integrated circuit of claim 1, wherein the photosensor comprises a photodiode electrically connected to a gate of the amplifying transistor.

4. The integrated circuit of claim 1, wherein the set of weights comprises non-volatile memory, wherein non-volatile memory comprises at least one of a set of transistors, a set of diodes, read-only memory (ROM), random access-memory (RAM), magnetoresistive RAM (MRAM), resistive RAM (RRAM), phase-change RAM (PCRAM), ferroelectric RAM (FeRAM), or a combination thereof.

5. The integrated circuit of claim 1, further comprising a read circuitry, where an output of amplifier is readable by operation of the read circuitry.

6. The integrated circuit of claim 5, wherein the read circuitry is operable by input of a bit line and input of a word line.

7. The integrated circuit of claim 1, further comprising eDRAM circuitry.

8. The integrated circuit of claim 7, wherein the eDRAM circuitry comprises a writable transistor and a second amplifying transistor, wherein the eDRAM circuitry is electrically connected to a gate of the second amplifying transistor and wherein an output of the amplifier is electrically connected to a source of the second amplifying transistor.

9. The integrated circuit of claim 1, wherein the set of weights correspond to a set of values of one or more kernel.

10. The integrated circuit of claim 1, wherein the sensor comprises a pixel, wherein the set of weights comprises ROM, wherein the pixel and the ROM are monolithically integrated.

11. The integrated circuit of claim 10, further comprising at least one of eDRAM circuitry, read out circuitry (ROC), analog to digital converters (ADC), application-specific integrated circuitry (ASIC), and a combination thereof, wherein the at least one of eDRAM circuitry, ROC, ADS, ASIC, and the combination thereof is monolithically or heterogeneously integrated with the pixel.

12. The integrated circuit of claim 1, wherein the sensor comprises a pixel, wherein the set of weights comprises ROM, wherein the pixel and ROM are heterogeneously integrated and wherein the pixel and ROM correspond to different technology nodes.

13. The integrated circuit of claim 12, further comprising at least one of eDRAM circuitry, read out circuitry (ROC), analog to digital converters (ADC), application-specific integrated circuitry (ASIC), and a combination thereof, wherein the at least one of eDRAM circuitry, ROC, ADS, ASIC, and the combination thereof is heterogeneously integrated with the pixel and wherein at least one of eDRAM circuitry, ROC, ADS, ASIC, and the combination thereof corresponds to a different technology node than the pixel.

14. A device comprising:

an array of cells, each of the cells comprising one or more integrated circuits comprising:

an amplifier;

a sensor electrically connected to a first input of the amplifier; and a set of weighting elements electrically connected to a second input of the amplifier, wherein the amplifier is configured to weight an output of the sensor according to an output of the set of weighting elements; and one or more processors; and a tangible, non-transitory, machine-readable medium storing instructions that when executed by the one or more processors effectuate operations comprising:

writing a weight value to at least one weighting element of the one or more weighting elements, wherein the written weight value is stored through power interruption;

selecting one or more weighting elements of the set of weighting elements;

providing sensor input to the array; and determining outputs of the cells of the array corresponding to the sensor input based on the selected one or more weighting elements.

15. The device of claim 14, wherein the set of weighting elements of the cells correspond to a set of kernels.

16. The device of claim 14, wherein selecting one or more weighting elements of the set of weighting elements comprises selecting at least one of the one or more weighting elements corresponding to a kernel; and wherein determining outputs of the cells of the array comprises determining outputs of the cells of the array corresponding to the sensor input weighted according to the weighting elements corresponding to the kernel.

17. The device of claim 14, further comprising a neural network, the operations further comprising providing the outputs of the cells of the array to the neural network.

18. The device of claim 14, wherein the written weight value replaces a previous weight value of the weighting element.

19. A method of integration comprising:

fabricating an array of cells, each of the cells comprising one or more integrated circuits comprising:

an amplifier, wherein the amplifier comprises an amplifying transistor;

a sensor electrically connected to a first input of the amplifier, wherein the sensor comprises a photosensor; and a set of weighting elements electrically connected to a second input of the amplifier, wherein the set of weights comprises parallel weights, wherein the amplifier is configured to weight an output of the sensor according to an output of the set of weighting elements, and wherein the parallel weights are electrically connected to a source of the amplifying transistor.

20. The method of claim 19 further comprising: steps for monolithic integration.

21. The method of claim 19 further comprising: steps for heterogeneous integration.

22. The device of claim 14, wherein the set of weighting elements comprises non-volatile memory, wherein non-volatile memory comprises at least one of a set of transistors, a set of diodes, read-only memory (ROM), random access-memory (RAM), magnetoresistive RAM (MRAM), resistive RAM (RRAM), phase-change RAM (PCRAM), ferroelectric RAM (FeRAM), or a combination thereof.

23. The method of claim 19, wherein each of the cells comprising one or more integrated circuits comprises a pixel.

* * * * *